US008913995B2

(12) United States Patent  
Vanderveen et al.

(10) Patent No.: US 8,913,995 B2
(45) Date of Patent: *Dec. 16, 2014

(54) TICKET-BASED CONFIGURATION PARAMETERS VALIDATION

(71) Applicant: QUALCOMM Incorporated, San Diego, CA (US)

(72) Inventors: Michaela Vanderveen, Tracy, CA (US); Georgios Tsirtsis, London (GB); Vincent D. Park, Budd Lake, NJ (US); Mathew Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,046

(22) Filed: Apr. 4, 2013

(65) Prior Publication Data

US 2013/0227655 A1    Aug. 29, 2013

Related U.S. Application Data

(63) Continuation of application No. 12/209,440, filed on Sep. 12, 2008, now Pat. No. 8,548,467.

(51) Int. Cl.

| H04M 1/66 | (2006.01) |
|---|---|
| H04W 12/06 | (2009.01) |
| H04L 29/06 | (2006.01) |
| H04W 28/18 | (2009.01) |
| H04W 74/00 | (2009.01) |
| H04W 76/02 | (2009.01) |
| H04W 84/18 | (2009.01) |
| H04W 92/18 | (2009.01) |

(52) U.S. Cl.

CPC ........... *H04W 12/06* (2013.01); *H04L 63/0823* (2013.01); *H04W 28/18* (2013.01); *H04W 74/00* (2013.01); *H04W 76/023* (2013.01); *H04W 84/18* (2013.01); *H04W 92/18* (2013.01)

USPC ........ 455/411; 455/410; 455/435.1; 370/338; 370/352

(58) Field of Classification Search

CPC .. H04L 63/0823; H04W 12/06; H04W 28/18; H04W 92/18; H04W 76/023; H04W 84/18; H04W 74/00

USPC ............ 455/410–411, 435.1–435.3; 370/313, 370/400, 410, 353, 328, 338, 352; 709/203, 709/204, 229, 231; 713/151, 156, 171

See application file for complete search history.

(56) References Cited

U.S. PATENT DOCUMENTS

| 6,065,117 A | 5/2000 | White |
|---|---|---|
| 6,725,376 B1 | 4/2004 | Sasmazel et al. |

(Continued)

FOREIGN PATENT DOCUMENTS

| CN | 1351789 A | 5/2002 |
|---|---|---|
| CN | 1645792 A | 7/2005 |

(Continued)

OTHER PUBLICATIONS

Bagnulo M, et al., "Efficient security for IPv6 multihoming" 14-20 Computer Communication Review, ACM, New York, NY, US LNKD-001:10.1145/1064413.1064420, vol. 35, No. 3, Apr. 1, 2005, pp. 61-68, XP002506494 ISSN: 0146-4833 abstract I i ne.

(Continued)

*Primary Examiner* — Sharad Rampuria

(74) *Attorney, Agent, or Firm* — James K. O'Hare

(57) ABSTRACT

Aspects describe spectrum authorization, access control, and configuration parameters validation. Devices in an ad-hoc or peer-to-peer configuration can utilize a licensed spectrum if the devices are authorized to use the spectrum, which can be determined automatically. Aspects relate to distribution of authorization tickets by an authorization server as a result of validating a device's credentials and services to which the device is entitled. An exchange and verification of authorization tickets can be performed by devices as a condition for enabling a validated wireless link using the spectrum.

20 Claims, 18 Drawing Sheets

(56) References Cited

U.S. PATENT DOCUMENTS

| | | |
|---|---|---|
| 6,772,331 B1 | 8/2004 | Hind et al. |
| 7,181,620 B1 * | 2/2007 | Hur ............................... 713/171 |
| 7,231,663 B2 | 6/2007 | Medvinsky |
| 7,392,390 B2 | 6/2008 | Newcombe |
| 7,451,217 B2 | 11/2008 | Wardrop |
| 7,457,283 B2 | 11/2008 | Dalton, Jr. et al. |
| 7,568,098 B2 | 7/2009 | Yeates et al. |
| 7,644,275 B2 | 1/2010 | Mowers et al. |
| 7,661,129 B2 | 2/2010 | Panasyuk et al. |
| 7,877,480 B2 | 1/2011 | Wardrop |
| 7,885,410 B1 | 2/2011 | Meier et al. |
| 7,899,188 B2 | 3/2011 | Abu-Amara |
| 7,907,970 B2 | 3/2011 | Park et al. |
| 7,917,946 B2 | 3/2011 | Lindholm et al. |
| 7,958,041 B2 | 6/2011 | Stanforth et al. |
| 8,036,207 B2 * | 10/2011 | Sivakumar et al. ........... 370/351 |
| 8,041,627 B2 | 10/2011 | Stanforth et al. |
| 8,139,496 B2 | 3/2012 | Stanforth et al. |
| 8,170,048 B1 | 5/2012 | Gossett et al. |
| 8,171,123 B2 | 5/2012 | Takeda et al. |
| 8,195,233 B2 | 6/2012 | Morikuni et al. |
| 8,199,768 B1 | 6/2012 | Gossett et al. |
| 8,213,900 B2 * | 7/2012 | Heutschi et al. ............... 455/406 |
| 8,213,903 B2 * | 7/2012 | Pudney et al. ................. 455/411 |
| 8,234,208 B2 | 7/2012 | Stanforth et al. |
| 8,239,927 B2 | 8/2012 | Benaloh et al. |
| 8,249,966 B2 | 8/2012 | Stanforth et al. |
| 8,295,871 B2 | 10/2012 | Axnas et al. |
| 8,332,923 B2 | 12/2012 | Oba et al. |
| 8,364,951 B2 * | 1/2013 | Peterka et al. ................. 713/155 |
| 8,434,133 B2 | 4/2013 | Kulkarni et al. |
| 8,474,028 B2 | 6/2013 | Kulkarni et al. |
| 8,548,467 B2 * | 10/2013 | Vanderveen et al. ....... 455/435.1 |
| 8,666,077 B2 * | 3/2014 | Patel et al. .................... 380/272 |
| 8,671,444 B2 | 3/2014 | Kulkarni et al. |
| 2003/0084302 A1 | 5/2003 | de Jong et al. |
| 2003/0229789 A1 * | 12/2003 | Morais et al. ................. 713/171 |
| 2004/0064693 A1 | 4/2004 | Pabla et al. |
| 2005/0044411 A1 | 2/2005 | Somin et al. |
| 2005/0074124 A1 | 4/2005 | Thornton et al. |
| 2005/0076244 A1 | 4/2005 | Watanabe |
| 2005/0160273 A1 | 7/2005 | Oishi |
| 2005/0172333 A1 | 8/2005 | Kim |
| 2006/0083205 A1 | 4/2006 | Buddhikot et al. |
| 2006/0294022 A1 | 12/2006 | Dayan et al. |
| 2007/0154016 A1 | 7/2007 | Nakhjiri et al. |
| 2007/0177731 A1 | 8/2007 | Spies et al. |
| 2007/0198831 A1 | 8/2007 | Suzuki et al. |
| 2007/0233827 A1 | 10/2007 | McKnight |
| 2008/0108322 A1 * | 5/2008 | Upp ............................... 455/411 |
| 2008/0162936 A1 | 7/2008 | Haddad |
| 2009/0158394 A1 | 6/2009 | Oh et al. |
| 2009/0217033 A1 | 8/2009 | Costa et al. |
| 2009/0233578 A1 * | 9/2009 | Feder et al. ................... 455/410 |
| 2010/0069067 A1 | 3/2010 | Vanderveen et al. |
| 2010/0070760 A1 | 3/2010 | Vanderveen et al. |
| 2010/0083354 A1 | 4/2010 | Tsirtsis |
| 2011/0004766 A1 | 1/2011 | Camarillo et al. |

FOREIGN PATENT DOCUMENTS

| | | |
|---|---|---|
| CN | 1956376 A | 5/2007 |
| EP | 1557973 | 7/2005 |
| JP | 2003500923 A | 1/2003 |
| JP | 2003520535 A | 7/2003 |
| JP | 2004274193 A | 9/2004 |
| JP | 2005110112 A | 4/2005 |
| JP | 2005210285 A | 8/2005 |
| JP | 2007074391 A | 3/2007 |
| JP | 2007166189 A | 6/2007 |
| JP | 2008510341 A | 4/2008 |
| JP | 2009533984 A | 9/2009 |
| KR | 20080040256 | 5/2008 |
| TW | 498669 B | 8/2002 |
| WO | 0072506 A1 | 11/2000 |
| WO | 2004019640 A1 | 3/2004 |
| WO | WO-2006016328 A1 | 2/2006 |
| WO | 2007121378 A2 | 10/2007 |
| WO | WO-2007112692 A1 | 10/2007 |
| WO | 2008043449 A1 | 4/2008 |

OTHER PUBLICATIONS

Brik V et al., "DSAP: A Protocol for Coordinated Spectrum Access" 2005 1st IEEE International Symposium on New Frontiers in Dynamic Spectrum Access Netwroks, Baltimore MD US LNKD-DOI:10.1109/SYSPAN.2005.1542680 Nov. 8, 2005 pp. 611-614, XP010855160.

D. Johnson, Rice University: C Perkins, Nokia Research Center; J. Arkko, Ericsson; "Mobility Support in IPV6": Jun. 2004, Network Working Group, Request for Comments, 3775, Category: Standards Track;http//tools.ietf.org/html/rfc3775.

F Dupont, et al Care-of Address Test for MIPv6 using a State Cookie draft-dupont-mipv6-rrcookie-06txt Jun. 2, 2008 http://toolsiettorg/html/draft-dupont-mipv6-rrcookie.

International Search Report—PCT/US09/055262, International Search Authority European Patent Office May 4, 2010.

Lootah et al. "TARP: ticket-based address resolution protocol" Computer Networks, Elsevier Science Publisers B.V.. Amsterdam, NL, vol. 51, No. 15, Aug. 23, 2007 pp. 4322-4337, XP022211699.

Park J.M. et al., "A Ticket Based AAA Security Mechanism in Mobile IP Network", pp. 210-219 (ICCSA 2003).

T Aura Cryptographically Generated Addresses (CGA) Mar. 2005 http://toolsiefforgthtml/r1c3972.

Taiwan Search Report—TW098129433—TIPO—Nov. 29, 2012.

Vladimir Brik et al: "Towards an Architecture for Efficient Spectrum Slicing" 8th IEEE Workshop on Mobile Comping Systems and Applications, 2007 Hotmobile IEEE, Piscataway, NJ US Mar. 1, 2007 pp. 64-69 XP031165181.

Written Opinion—PCT/US2009/055262, International Search Authority, European Patent Office, May 4, 2010.

Yihong Zhou et al., "Authentication, Authorization, and Accounting for Real-Time Secondary Market Services" Communications, 2005, ICC 2005 IEEE International Conference on Seoul, Korea May 16-20, 2005 vol. 2 Jun. 16, 2005 pp. 1005-1009 xp010825440.

* cited by examiner

TICKET-BASED CONFIGURATION PARAMETERS VALIDATION

BACKGROUND

I. Field

The following description relates generally to wireless communications and more particularly to authorizing communications over a licensed spectrum.

II. Background

Wireless communication systems are widely deployed to provide various types of communication and to transfer information regardless of where a user is located (inside or outside a structure) and whether a user is stationary or moving (e.g., in a vehicle, walking). For example, voice, data, video and so forth can be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless communication networks are established through a device communicating with a base station or access point. The access point covers a geographic range or cell and, as the device is operated, the device can be moved in and out of these geographic cells.

A network can also be constructed utilizing solely peer-to-peer devices without utilizing access points or the network can include both access points and peer-to-peer devices. These types of networks are sometimes referred to as ad hoc networks. Ad hoc networks can be self-configuring whereby when a device (or access point) receives communication from another device, the other device is added to the network. As devices leave the area, they are dynamically removed from the network. Thus, the topography of the network can be constantly changing.

Ad-hoc networks enable communication devices to transmit and/or receive information while on the move. Communication is established using the spectrum, which is a valuable, limited resource comprising a broad range of electromagnetic radio frequencies utilized in the transmission of multiple types of data. Ad-hoc networks may be communicatively coupled to other public or private networks, for example through wired and/or wireless access points, in order to enable the transfer of information to and from a device. Such ad-hoc networks typically include a multitude of devices communicating in a peer-to-peer manner. Ad-hoc networks may also include beacon points that emit strong signals to facilitate peer-to-peer communication amongst devices. For example, emitted beacons can contain timing information to aid in timing synchronization of such devices. These beacon points are positioned to provide wide area coverage as the device travels within and across different coverage areas.

If a communication system does not require operator-owned access points but utilizes a licensed spectrum belonging to a spectrum owner/licensee/provider, only authorized devices should be enabled to use the spectrum. In order for the spectrum owner/licensee to be reimbursed for the spectrum license fees, authorization for the spectrum is granted for devices associated with users or organizations that possess a business relationship with the spectrum provider or a broker representative thereof.

Thus, the spectrum provider can control use of its spectrum by employing an authorization server, which is a core network node or set of nodes that communicate with devices on a timeline or upon events as prescribed by user service agreements or by spectrum provider administration, in order to authenticate and authorize the devices to utilize the spectrum according to their service agreements.

Associated with ad-hoc communication using the spectrum is a series of configuration parameters necessary to properly make use of such links. These parameters are Internet Protocol (IP) addresses, upper-layer or network-layer identifiers, service identifiers, and the like. Misconfiguration of these parameters can result in security breaches. For example if a (misbehaving) device is able to utilize an IP address belonging to another network node as if that (stolen) IP address belongs to the misbehaving device, peers communicating with the misbehaving device may inadvertently cause data traffic intended for the network node to be redirected to the misbehaving device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with authorization of devices to communicate directly with other devices utilizing the licensed spectrum. In accordance with some aspects, the authorization is based on prescribed user/service agreements. Configuration parameters that are employed to enable correct use of the spectrum can be vouched for by the spectrum provider authorization server and, thus, can be verified by peer devices. Such peer devices can be spectrum-authorized and are provided with authorized configuration parameters that can be utilized in the process of peer-to-peer/ad-hoc communication utilizing the spectrum.

An aspect relates to a method for validating ticket-based configuration parameters. The method includes associating a device with one or more validated information elements and transmitting an authorization ticket certified by a trusted party to the device. The ticket includes a subset of the one or more validated information elements, wherein the device uses the authorization ticket to establish a communication link with another device.

It should be noted that the process of validating the information elements is separate and distinct from the validation of authorization tickets. The trusted third party can obtain pre-validated information elements from another party or can validate the information elements itself through some other, separate process.

Another aspect relates to a wireless communications apparatus that includes a memory and a processor. The memory retains instructions related to associating a device with one or more validated information elements and transmitting an authorization ticket certified by a trusted party to the device. The ticket includes a subset of the one or more validated information elements, wherein the device uses the authorization ticket to establish a communication link with another device. The processor is coupled to the memory and is configured to execute the instructions retained in the memory.

Yet another aspect relates to a wireless communications apparatus that provides ticket-based validation parameters. The apparatus includes means for associating a device with one or more validated information elements and means for transmitting an authorization ticket certified by a trusted party to the device. The ticket includes a subset of the one or more validated information elements. The device uses the authorization ticket to establish a communication link with another device.

Yet another aspect relates to a computer program product comprising a computer-readable medium. The computer-readable medium comprises a first set of codes for causing a computer to communicate with a device and a second set of codes for causing the computer to determine whether to create an authorization ticket for the device. The computer-readable medium also comprises a third set of codes for causing the computer to associate the device with one or more validated information elements and a fourth set of codes for causing the computer to communicate the authorization ticket to the device. The authorization ticket includes a subset of one or more validated information elements.

Yet another aspect relates to at least one processor configured to validate ticket-based configuration parameters. The processor includes a first module for consulting a database of authorized devices and associated parameters identified by a device identifier. The database contains information related to a configuration each device can use to communicate in a licensed spectrum. The processor also includes a second module for associating a device with one or more validated information elements and a third module for transmitting an authorization ticket certified by a trusted party to the device. The ticket includes a subset of the one or more validated information elements and the information related to the configuration the device can use to communicate, wherein the device uses the authorization ticket to establish a communication link with another device.

Still another aspect relates to a method for validation of ticket-based configuration parameters. The method includes obtaining an authorization ticket that includes one or more validated information elements associated with a device and validating the authorization ticket. The method also includes utilizing the authorization ticket to establish a validated communication with the device and using a subset of the one or more validated information elements to perform a configuration operation.

A further aspect relates to a wireless communications apparatus comprising a memory and a processor. The processor is coupled to the memory and is configured to execute the instructions retained in the memory. The memory retains instructions related to obtaining an authorization ticket that includes one or more validated information elements associated with a device and validating the authorization ticket. The memory also retains instructions related to utilizing the authorization ticket to establish a validated communication with the device and using a subset of the one or more validated information elements to perform a configuration operation.

Still another aspect relates to a wireless communications apparatus that validates ticket-based configuration parameters. The apparatus includes means for acquiring an authorization ticket that includes one or more validated information elements associated with a device and means for validating the authorization ticket. The apparatus also includes a means for establishing a validated communication with the device based in part on the authorization ticket and a means for performing a configuration operation with a subset of the one or more validated information elements.

A further aspect relates to computer program product that includes a computer-readable medium. The computer-readable medium includes a first set of codes for causing a computer to obtain an authorization ticket that includes one or more validated information elements associated with a device and a second set of codes for causing the computer to validate the authorization ticket. The computer-readable medium also includes a third set of codes for causing the computer to utilize the authorization ticket to establish a validated communication with the device and a fourth set of codes for causing the computer to use a subset of the one or more validated information elements to perform a configuration operation.

Yet another aspect relates to at least one processor configured to provide spectrum authorization and access control. The processor includes a first module for acquiring an authorization ticket that includes one or more validated information elements associated with a device and a second module for validating the authorization ticket. The processor also includes a third module for employing the authorization ticket to establish a validated communication with the device and a fourth module for utilizing a subset of the one or more validated information elements to perform a configuration operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
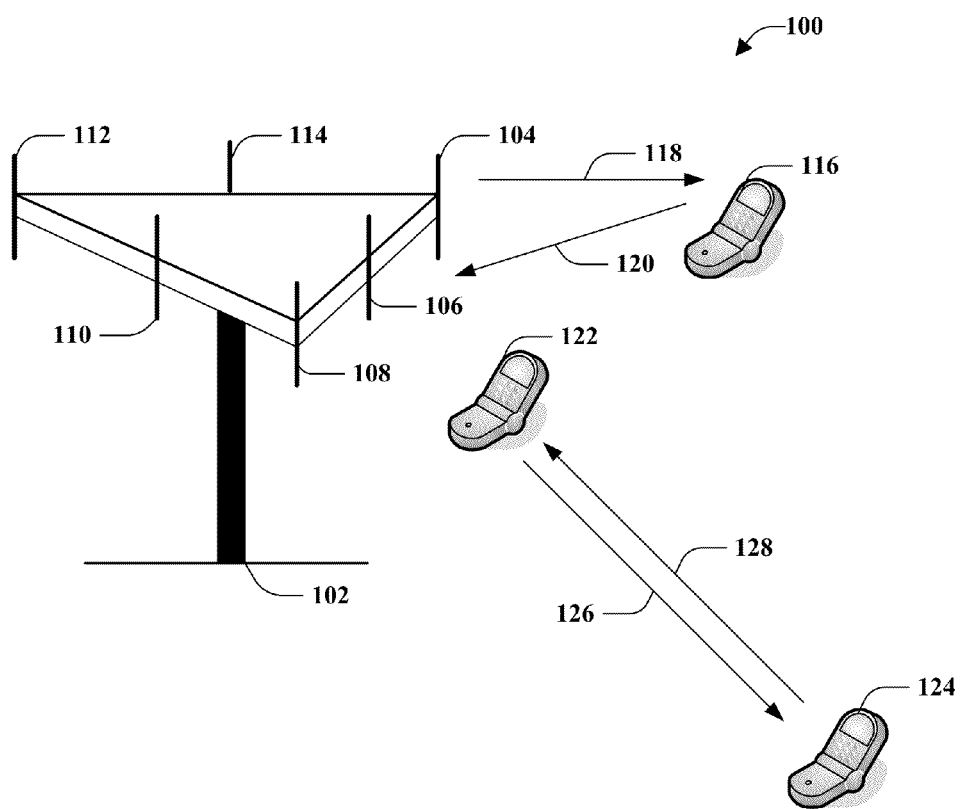
FIG. 1 illustrates a wireless communication system in accordance with various aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a device. A device can also be called, and may contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, illustrated is a wireless communication system 100 in accordance with various aspects. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Additionally, the base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120.

In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer devices.

A communication network can include any number of devices or nodes that are in wireless communication. Each device or node can be within range of one or more other devices or nodes and can communicate with the other devices/nodes or through utilization of the other devices/nodes, such as in a multi-hop topography (e.g., communications can hop from node to node until reaching a final destination). For example, a sender device may wish to communicate with a receiver device. To enable packet transfer between sender device and receiver device, one or more intermediate devices can be utilized. It should be understood that any device can be a sender device and/or a receiver device and can perform functions of either sending and/or receiving information at substantially the same time (e.g., can broadcast or communicate information at about the same time as receiving information and/or at a different time).

System 100 can be configured to enable usage of a spectrum for data communication by authorized devices, wherein devices that are not authorized (e.g., traditional or common devices) cannot use the spectrum. Authorization tickets can be distributed by a trusted third party after validation of a device's credentials and the services to which the device is entitled. Further, system 100 can mandate the exchange and verification of authorization tickets by devices as a condition for configuring a wireless link utilizing the spectrum.

Figure 2:
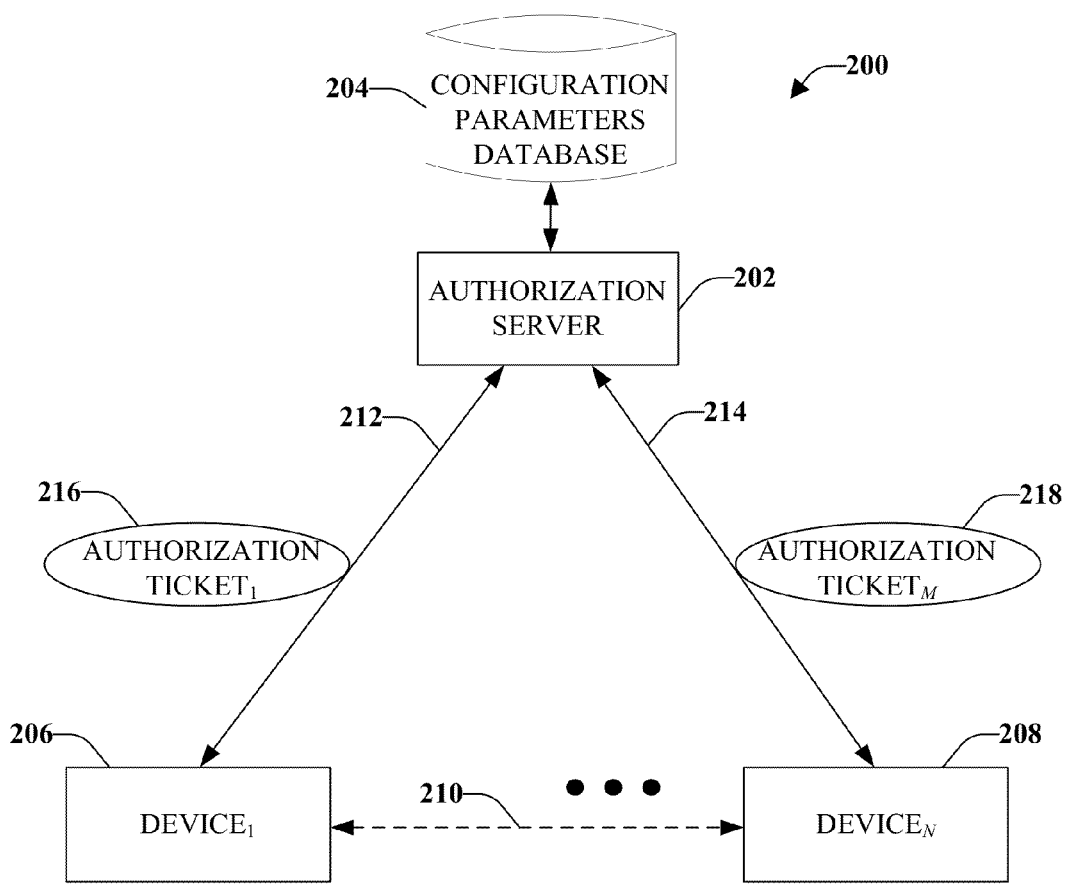
FIG. 2 illustrates a system for spectrum use authorization.

FIG. 2 illustrates a system 200 for spectrum use authorization. System 200 can be configured to enable communications authorized (or vouched for) by a spectrum provider (or a trusted third party) to occur between devices (e.g., in a peer-to-peer manner) or between devices and base stations.

System 200 includes an authorization server 202 and a configuration parameters database 204. The authorization server 202 can be co-located or communicatively coupled to the configuration parameters database 204. Also included in system 200 are devices, labeled device$_1$ 206 and device$_N$ 208, where N is an integer. Devices 206, 208 can be mobile devices and/or base stations that operate similar to mobile devices in accordance with the disclosed aspects (e.g., the fact that the base stations are typically connected to other networks or infrastructure is not relevant to the disclosed aspects). Devices 206, 208 can communicate with each other (illustrated by bidirectional communication link 210), and with other devices wirelessly. Further, devices 206, 208 can communicate with authorization server 202 wirelessly or through wired links (illustrated by bidirectional communication links 212 and 214). If the communication between a device 206, 208 and the authorization server 202 is wireless, the communication may or may not be through a licensed spectrum, such as the licensed spectrum that is used by devices 206, 208 to communicate with each other. In accordance with some aspects, the link between devices (link 210) and the links between one or more devices 206, 208 and the authorization server 202 (links 212 or 214) can be the same link or a similar link.

Authorization server 202 can selectively distribute authorization for use of a spectrum, such as a licensed spectrum, to one or more devices 206, 208. The authorization can be distributed in the form of an authorization ticket, illustrated as authorization ticket$_1$ 216 and authorization ticket$_M$ 218, where M is an integer. The authorization ticket 216, 218 can include various information such as a device identifier, a validity period, a cryptographic signature of the authorizing device (e.g., authorization server 202), as well as other information. Further information relating to the authorization ticket will be provided below.

The authorization tickets 216, 218 can be utilized by the devices 206, 208 to enable communication among the devices 206, 208. In accordance with some aspects, the authorization tickets 216, 218 can be utilized to authorize a certain use (e.g., to authorize services) of the spectrum. In accordance with some aspects, the authorization tickets 216, 218 can be distributed to the one or more devices 206, 208 using a network layer protocol. It should be understood that a device to which authorization to the (licensed) spectrum is not given does not receive an authorization ticket.

To distribute the authorization tickets, authorization server 202 can periodically (e.g., once a month, another predetermined interval) communicate with the one or more devices 206, 208 and provide the appropriate authorization ticket to each device individually. For example, authorization server 202 can transmit a new authorization ticket having a different validity range than an authorization ticket that was previously transmitted to the device. Each device 206, 208 receives an authorization ticket that is different from an authorization ticket provided to another device. For example, authorization server 202 transmits authorization ticket$_1$ 216 to device$_1$ 206 and authorization ticket$_M$ 218 to device$_N$ 208. Each device 206, 208 can retain its authorization ticket, such as in a storage media.

The devices 206, 208 exchange the authorization tickets to establish a validated communication link 210 between each other. Thus, device$_1$ 206 sends authorization ticket$_1$ 216 to device$_N$ 208 and device$_N$ 208 sends authorization ticket$_M$ 218 to device$_1$ 206. Validation of the authorization tickets allows the devices (e.g., two mobile devices, a mobile device and an access point, and so forth) to communicate in a peer-to-peer manner in accordance with the disclosed aspects. If a device is not able to validate the authorization ticket of the device to which it desires to communicate, a validated communication link is not established between the devices.

Figure 3:
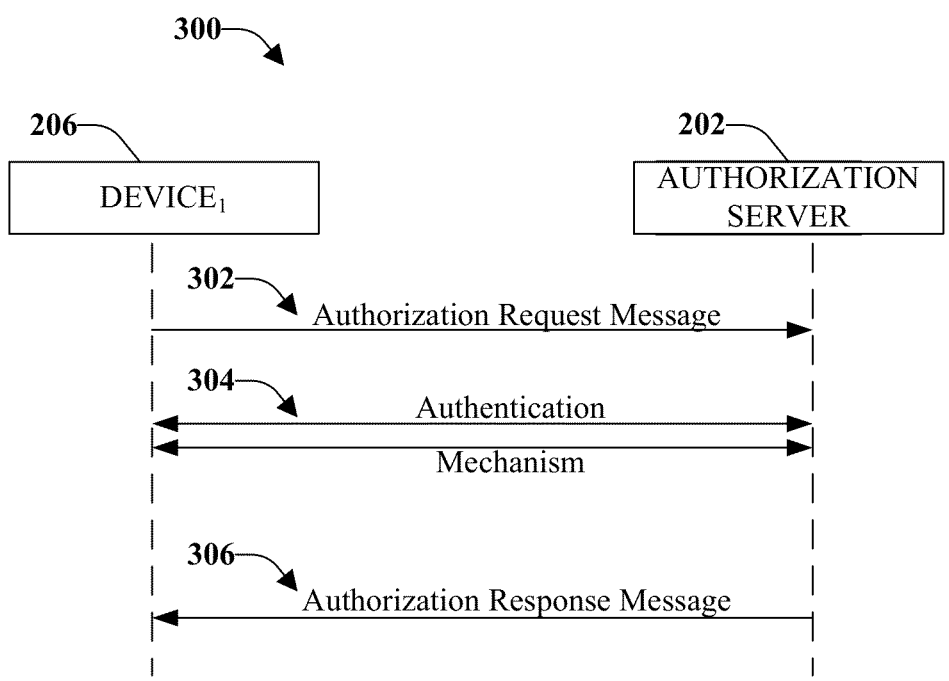
FIG. 3 illustrates a flow diagram of the operation of a device obtaining authorization from an authorization server.

FIG. 3 illustrates a flow diagram 300 of the operation of a device obtaining authorization from an authorization server. The authorization server 202 can be a trusted party that issues authorization tickets to devices, such as Device$_1$ 206. It should be appreciated that authorization server 202 can issue authorization tickets to a multitude of devices at substantially the same time, or at different times. However, only one device is illustrated for purposes of simplicity.

To initiate issuance of an authorization ticket, the device 206 sends an Authorization Request Message 302 that contains at least a unique identifier of the device (e.g., Device_ID_1). In accordance with some aspects, the Authorization Request Message 302 can include other credential information, such as a public key.

The device 206 can be triggered to send the Authorization Request Message 302 based on detection of an upcoming expiration of a previously obtained authorization ticket (e.g., the authorization ticket the device is currently using to communicate with other devices). In accordance with some aspects, sending the Authorization Request Message 302 can be triggered by an order for user applications to enable a wireless link while there is no valid authorization ticket retained in the device (e.g., in a storage medium).

Additionally or alternatively, the device 206 can be triggered to send the Authorization Request Message 302 based on a request received from the authorization server 202. The authorization server 202 can transmit the request for administrative reasons and/or based on an indication that an amount or quota of data that was authorized to be sent/received by the device under the previous authorization ticket has been (or will be) exceeded. In this alternative aspect, a message (not shown) is received from the authorization server 202 prior the transmission of the Authorization Request Message 302.

At substantially the same time as receiving the Authorization Request Message 302, the authentication server 202 verifies the identity of the device 206 and the services to which the device 206 is entitled (e.g., the services that have been purchased, services allowed under a current plan, services allowed for no cost during a promotion period, and so forth). This is illustrated by the double bidirectional arrows at 304 (Authentication Mechanism). This verification process can be referred to as "authentication", "authorization", "accounting protocol", and/or "authentication protocol". Examples of such protocols include Transport Level Security (TLS), Internet Key Exchanges (IKE), and others.

In accordance with some aspects, device 206 sends credential information in response to a channel message sent by authorization server 202 as part of the message exchange 304. According to other aspects, both the device 206 and the authorization server 202 exchange respective credential information in order to perform a mutual authentication procedure and typically secure the communication channel between the device 206 and authorization server 202.

If the identity of the device 206 is verified, the authentication server 202 assigns/generates configuration parameters and includes this information in an authorization ticket created by the authentication server 202. Additionally or alternatively, authentication server 202 can assign/generate the configuration parameters in conjunction with one or more other databases or servers.

In accordance with some aspects, the newly created authorization ticket is substantially the same as a previous authorization ticket provided to the device 206. However, the newly created authorization ticket can have a different validity period (start time/end time) and a different cryptographic signature. In accordance with some aspects, the newly created authorization ticket can include authorization for services that are the same or different from the services authorized by the previous authorization ticket (e.g., more services, less services, different services). Further information relating to the authorization ticket will be described in further detail with reference to FIG. 4.

The newly created authorization ticket is sent to the device 206 in an Authorization Response Message 306. According to some aspects, the authorization ticket might be encrypted with the intent that the ticket can only be decrypted by the device for which it is intended (e.g., device 206). The device 206 can retain the authorization ticket in a storage medium for later use to establish a validated communication link with other devices.

Figure 4:
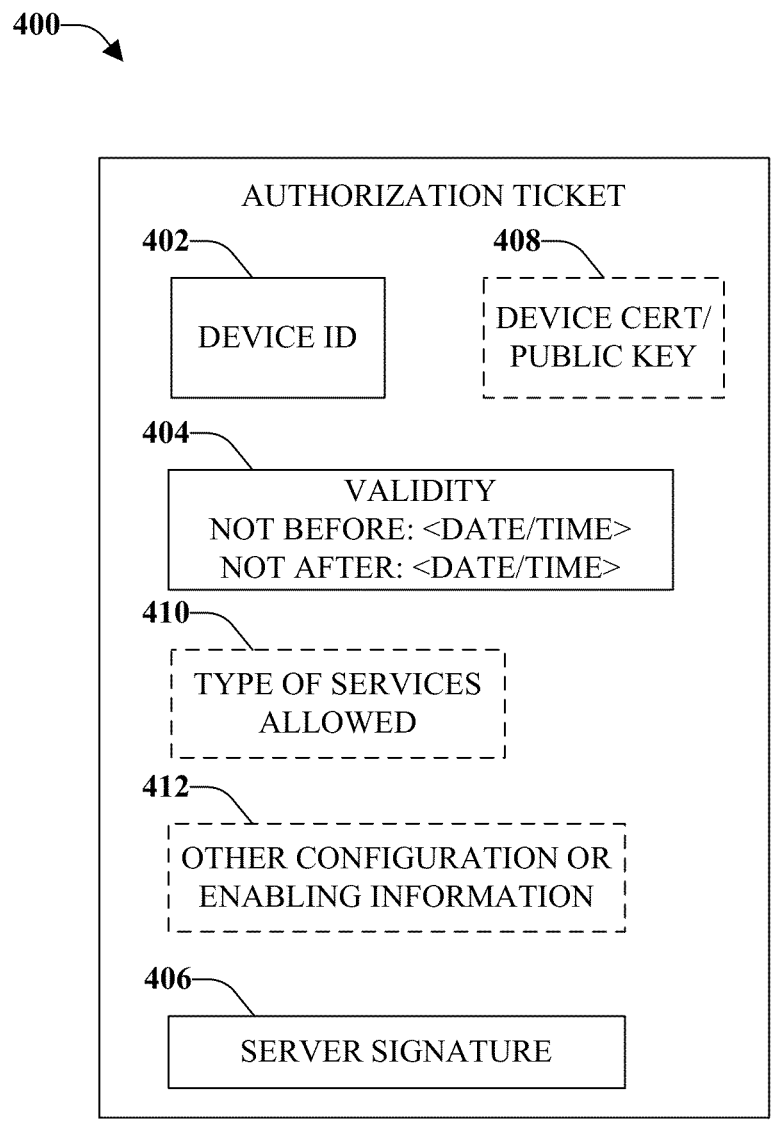
FIG. 4 illustrates an example authorization ticket that can be utilized with the disclosed aspects.

FIG. 4 illustrates an example authorization ticket 400 that can be utilized with the disclosed aspects. It should be understood that the illustrated and described authorization ticket 400 is provided for ease of understanding this detailed description and other authorization tickets can be utilized.

Included in authorization ticket 400 are a device identifier 402, a validity period 404, and a cryptographic signature 406 of the authorizing server, covering the entire ticket 400 data. The validity period 404 includes a start time (e.g., not before: <date/time>) and an end time (e.g., not after: <date/time>). A validity period 404 can create a level of security because, if an authorization ticket is fraudulently obtained by a misbehaving device, upon expiration, that authorization ticket will no longer be usable by the misbehaving device.

In accordance with an optional aspect, the authorization ticket 400 can contain information that can be utilized to authenticate the ticket holder (e.g., device). This information, represented as optional by the dashed line at 408, can be in the form of a digital certificate, a public key, a hash of a public key belonging to the device as indicated by the device identifier 402, as well as other authentication means.

Additionally or alternatively, the authorization ticket 400 can include an optional (denoted by the dashed line) list of (or a representation of) the types services 410 that the device, identified by device identifier 402, is permitted to consume using the spectrum in a peer-to-peer or a group manner (e.g., voice or video calls, data exchange with a maximum or minimum rate, receipt of special broadcast information, and so forth). According to some aspects, the information 410 on allowed services is taken into account by other devices that are validating the ticket 400 such that the other device(s) can decide whether and how to enable a validated communication link. If the valid communication link is enabled, the other device(s) can configure the link to carry only the type of data and/or data rate as specified in a list of the type of services allowed.

The authorization ticket 400 may also optionally contain (as noted by the dashed line) other configuration or enabling information 412. This other information 412 can include a piece of data given out to all authorized devices and utilized in an ad-hoc network to configure the physical or media access control channels, so that only authorized devices can communicate using these channels. In accordance with some aspects, the other information 412 includes configuration information and/or an assigned parameters list, which can be utilized by other devices that are validating the authorization ticket in order for the other devices to determine how to correctly configure the link.

Figure 5:
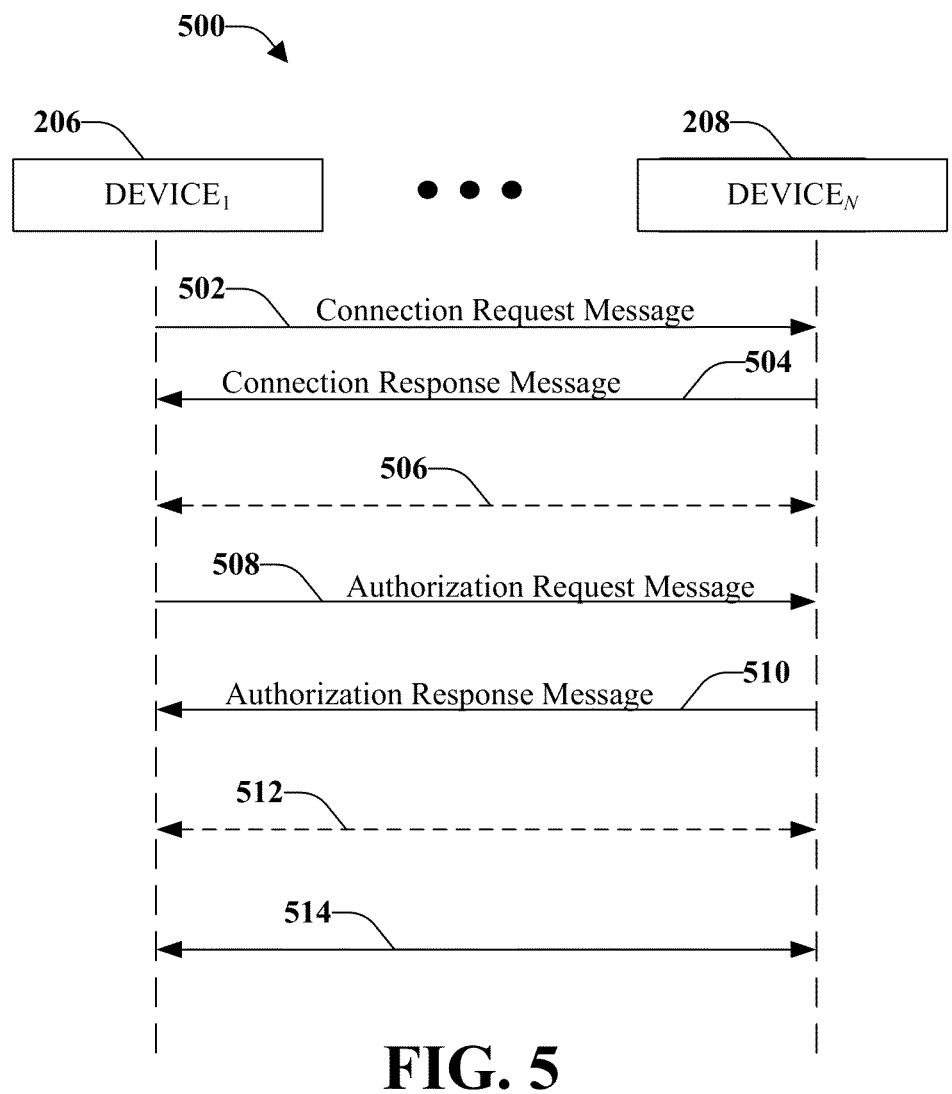
FIG. 5 illustrates a flow diagram of an operation of two devices establishing a validated communication link by first validating spectrum use authorization and/or associated configuration parameters in accordance with the various aspects disclosed herein.

FIG. 5 illustrates a flow diagram 500 of an operation of two devices establishing a validated communication link by first validating spectrum use authorization and/or associated configuration parameters in accordance with the various aspects disclosed herein. When a first device ($Device_1$) 206 desires to communicate with one or more other devices ($Device_N$) 208, using the spectrum, the first device 206 transmits a Connection Request Message 502. The Connection Request Message 502 includes an identifier of the first device 206 (e.g., "ID-Device-1"). In accordance with some aspects, the Connection Request Message 502 includes an authorization ticket that identifies (and that belongs) to the first device 206.

The second device 208 can respond to the Connection Request Message 502 with a Connection Response Message 504 that contains an identifier of the second device 206 (e.g., "ID-Device-N"). In accordance with some aspects, the Connection Response Message 504 can be transmitted after second device 208 verifies the contents of the authorization ticket received from first device 206. The Connection Response Message 504 can include an authorization ticket that identifies (and that belongs to) the second device 208. At substantially the same time as receiving the Connection Response Message 504, first device 206 can verify the contents of the authorization ticket received from second device 208.

Either or both the Connection Request Message 502 and the Connection Response Message 504 can contain the public keys(s) associated with the device sending the message (e.g., "public-key-1", "public-key-N"). In accordance with some aspects, either or both messages 502, 504 include a complete digital certificate.

In an optional aspect as denoted by dashed line 506, one or more other messages can be exchanged. These other messages 506 can be sent with the purpose of achieving mutual identity authentication. For example, first device 206 can authenticate the identity of second device 208 (e.g. verify identity "ID-Device-N") and the second device 208 can authenticate the identity of first device 206 (e.g., verify identity "ID-Device-1").

A purpose of messages 502, 504, and optionally 506, is to achieve mutual identity authentication. The mutual identity authentication is different from the authorization verification process. In accordance with some aspects, both the mutual identity authentication and the authorization verification processes can be performed at substantially the same time.

According to various aspects, identity authentication can be achieved by employing digital certificates. For example, two devices 206, 208 can engage in a protocol whereby each device transmits their certificate and other information (e.g., a random number or nonce). This exchange can assist to verify that the other device is indeed in possession of the private key associated with the presented certificate.

In accordance with some aspects, the identity authentication can also result in establishing a shared secret key that can be utilized to secure the communication channel between devices 206 and 208.

According to other aspects, the digital certificate utilized for identity authentication and establishment of communication channel security can be the same as the spectrum authorization ticket. In this case, the identity authentication task and the authorization tasks are combined.

An authorization exchange takes place wherein the first device 206 sends an Authorization Request Message 508 to the second device 208. The Authorization Request Message 508 can include an authorization ticket of the first device 206. The second device 208 can respond with an Authorization Response Message 510 that can contain an authorization ticket of the second device 208.

At substantially the same time as receiving the Authorization Request Message 508, the second device 208 can verify the received authorization ticket (included in the message) of the first device 206. In a similar manner, at substantially the same time as receiving an Authorization Response Message 510, the first device 206 can verify the authorization ticket (included in the message) of the second device 208. Verification of the respective authorization tickets include confirming that the identifier in the ticket is the same identifier as the identifier that was validated during the mutual identity authentication, as discussed above.

It should be noted that, in accordance with some aspects, only verifying the authorization ticket might not be enough to achieve a proper amount of security. Therefore, the verification process can also include device or user identity authentication. According to this aspect, "authorization ticket verification" refers to the verification of the server-generated ticket (e.g., authorization ticket) and that the ticket belongs to the device sending the ticket, as identified by the identifier included in the ticket. Additionally or alternatively, the authorization ticket either has the form of a digital certificate or also includes a device or user digital certificate. Thus, in accordance with this aspect, each device needs to prove that it is the rightful owner of the presented authorization ticket. In accordance with some aspects, ownership of a digital certificate can be verified by showing a verified entity proof of possession of a private key associated with a public key that is present in the certificate.

In an optional aspect, as represented by dashed line 512, another security and/or configuration protocol may be administered between devices 206 and 208 for the purpose of secure key derivation and possibly other configurations.

After completion of the mutual verification of identities and authorization tickets, a link is configured utilizing the information/assigned parameters included in the exchanged authorization tickets. After configuration of the valid link, user data can be exchanged, at 514, between the devices 206 and 208 over the validated communication link.

It should be noted that the flow chart illustrated and described with reference to FIG. 5 is for illustration purposes only. For example, the mutual verification of identities and authorization tickets can be performed at times other than upon receipt of a connection message. Further, tasks such as identity verification and authorization verification can be combined. Additionally, entities can be exchanged and verified at a later time as part of the authorization ticket exchange and associated security protocols. Additionally or alternatively, messages sent by the first device 206 can be combined (e.g., messages 502 and 508; messages 502, 506, 508, and 512) in one or several messages. In a similar manner, messages from the second device 208 can be combined (e.g., messages 504 and 510; messages 504, 506, 510 and 512) in one or several messages.

In accordance with some aspects, authorization tickets can be obtained by a first device 206 through means other than directly from the second device 208. For example, the second device 208 can transmit its (unique) identifier and the first device 206 utilizes the identifier to retrieve and verify the second device's authorization ticket, which can be obtained from a server or local database.

According to various aspects, both devices 206, 208 verify the other device's identity and authorization ticket prior to allowing user data or other protocol data to flow, at 514, on the shared wireless link using the spectrum. It should also be understood that a similar process could be undertaken by more than two devices (e.g., when group wireless communication is employed using broadcast/multicast mechanisms). In multi-device scenarios, each device should successfully validate the authorization tickets granted to the other devices in the communication group prior to activating the wireless link or links to carry other data.

According to some optional aspects, other enforcement schemes can be utilized at substantially the same time as the spectrum use authorization validation described herein. For example, wireless sensor points can be placed over a geographical area. These sensor points can listen for unauthorized wireless data exchange. In another example, legitimate nodes can actively listen and report communication that was not preceded by the exchange of valid authorization tickets if the system requires that tickets to be explicitly exchanged.

In accordance with another aspect, first device 206 obtains an authorization ticket (e.g., from an authentication server) authorizing spectrum-use services of type "A" only (e.g., voice calls only). When establishing a communication between first device 206 and another device (e.g., second device 208), each device transmits its authorization ticket to the other device. If the second device 208 is entitled to services of type "A", the link is enabled for exchanging data of type "A" only. If at a later time, first device 206 desires to exchange data of type "B" (e.g., video) with second device 208, second device 208 does not cooperate because second device 208 is configured to not allow such data (e.g., type "B") to be sent and/or received.

Figure 6:
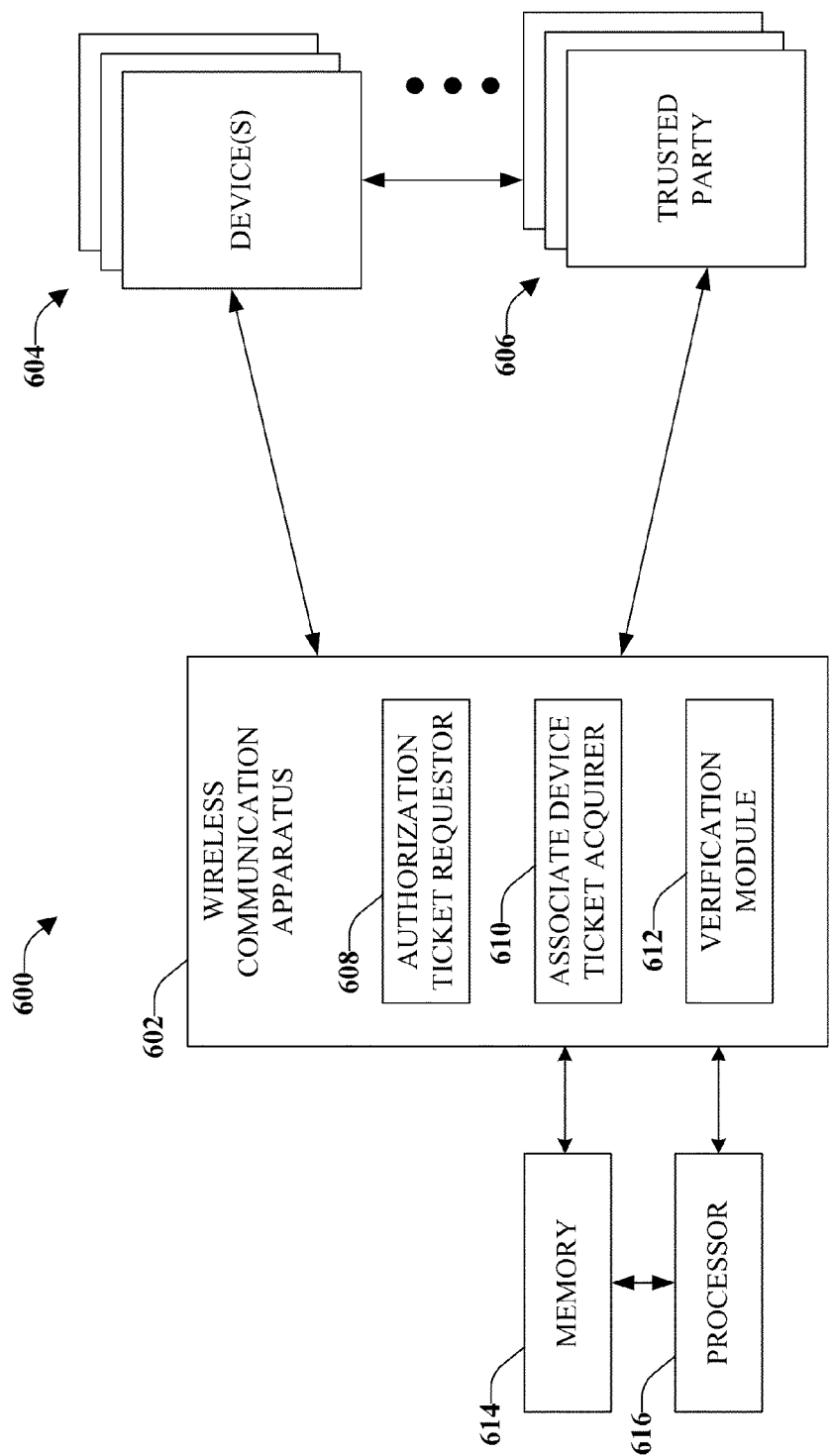
FIG. 6 illustrates a system for ticket-based spectrum authorization and access control in accordance with one or more aspects.

With reference now to FIG. 6, illustrated is a system 600 for ticket-based spectrum authorization and access control in accordance with one or more aspects. System 600 can be configured to enable a spectrum licensee/owner to extract revenue from devices communicating utilizing the (radio frequency) spectrum in an ad-hoc or peer-to-peer manner, without the need for controlled infrastructure. System 600 can enable the use of the spectrum for data communication by authorized devices though the distribution of authorization tickets and the exchange and verification of these authorization tickets between the devices for enablement of a validated wireless link that carries user or control data communications. Included in system 600 is a wireless communications apparatus 602 that can be in communication with one or more devices 604 and one or more trusted parties 606, which can be a node.

Wireless communications apparatus 600 includes an authorization ticket requestor 608 that obtains an authorization ticket issued for wireless communications apparatus 602. The authorization ticket for the wireless communications apparatus 602 is issued by a trusted third party 606. In accordance with some aspects, the trusted parties 606 can be authorization server(s) that issue authorization tickets.

In accordance with some aspects, communication with the trusted parties 606 (or authorization server(s)) is conducted through an interface, which can be a cellular wireless interface, a wired interface such as a Digital Subscriber Line (DSL), cable, and so forth.

Also included in wireless communications apparatus 600 is an associated device authorization ticket acquirer 610 that is configured to request or receive an authorization ticket from an associated device(s) 604 (e.g., a device to which communication is to be established). The authorization ticket is issued to the one or more associated devices 604 from the trusted third party that issued the authorization ticket for wireless communications apparatus 602 or from another trusted party. The authorization ticket of the associated device(s) 604 can include a validity time or cryptographic signature of the trusted party that issued the ticket.

According to some aspects, the authorization ticket of wireless communications apparatus 602 and/or the authorization ticket(s) of the associated device(s) 604 are embodied as a traditional digital certificate (e.g., X.509 standard). For example, a traditional digital certificate can include extensions to indicate authorization for spectrum use and/or can convey other information pertaining to establishing validated communication links.

A verification module 612 is configured to establish a valid communication session between the wireless communications apparatus 602 and one or more associated devices 604. The verification module 612 can validate the authorization ticket for the associated device (s). According to some aspects, the validated communication session can be secured based on information contained in the authorization ticket of wireless communication apparatus 602 and the authorization ticket(s) of the associated device(s) 604. A secured communication session refers to a communication session that has encryption/decryption and integrity protection.

In accordance with some aspects, the authorization ticket issued for wireless communications apparatus 602 is transmitted to the associated device (s) 604 in order for the associated device(s) to verify the identity of wireless communications apparatus 602 and to establish a validated communication session. Data between wireless communications apparatus 602 and the one or more devices 604 is not enabled to carry data until the authorization ticket exchange has been successfully conducted and the link has been validated.

In accordance with some aspects, a cellular interface can be utilized to enable communication between wireless communications apparatus 602, the device(s) 604, and/or the trusted parties 606. Although the cellular interface can be mostly for communication with other device(s) 604, the interface can be utilized for communication with access points (or base stations). For example, a cellular interface can carry data wirelessly from wireless communications apparatus 602 to an access point and from there onto one or more trusted third party 606. It should be noted, however, that the presence or involvement of access points is not necessary. Data can also be relayed through one or more other device, one of which is eventually connected to the network where a trusted third party 606 resides.

According to some aspects, the communication between wireless communications apparatus 602 and one or more trusted third party 606 is performed through a wireless interface. In accordance with this aspect, a direct point of communication may be another device or access point, which can in turn either relay the data to another entity that has a communication link with the trusted third party 606, or can send the data directly to the trusted third party 606. It should be noted that when implementing this aspect, communication through the interface using the licensed spectrum should not be enabled until after the authorization ticket is obtained (and verified). In one approach, the authorization protocol is run using this communications link, in the absence of another available interface, therefore, a means to bootstrap the authorization for spectrum use should be provided. It is understood that absent a valid authorization ticket, the communication through the interface is by configuration limited to only the protocol and data that pertains directly to the authorization process with the trusted party 606 (e.g., obtaining an authorization ticket).

In another approach, the authorization protocol is run by a "helper" device or access point on behalf of the wireless communications apparatus 602 seeking authorization. Thus, the wireless communications apparatus 602 only uses the interface to locate another access point or device and requests that device to run the needed authentication/authorization protocol with the trusted party 606 on behalf of the wireless communications apparatus 602. This process can involve relaying of data between the wireless communications apparatus 602 and the helper counterpart.

System 600 can include memory 614 operatively coupled to wireless communications apparatus 602. Memory 614 can be external to wireless communications apparatus 602 or can reside within wireless communications apparatus 602. Memory 614 can store information related to obtaining a first authorization ticket associated with wireless communications apparatus 602. The first authorization ticket can be issued by a trusted third party. Memory 614 can also store information related to receiving from a second device a second authorization ticket for the second device. The second authorization ticket can be issued by the trusted third party or another trusted party. Further, memory 614 can retain instructions related to establishing a validated communication session with the second device or with a multitude of devices.

A processor 616 can be operatively connected to wireless communications apparatus 602 (and/or memory 614) to facilitate analysis of information related to spectrum authorization and access control in a peer-to-peer or ad hoc communication network. Processor 616 can be a processor dedicated to analyzing and/or generating information received by wireless communications apparatus 602, a processor that controls one or more components of system 600, and/or a processor that both analyzes and generates information received by wireless communications apparatus 602 and controls one or more components of system 600.

Memory 614 can store protocols associated with spectrum authorization, access control between wireless communications apparatus 602, device(s) 604, and/or trusted parties 606, such that system 600 can employ stored protocols and/or algorithms to achieve improved communications in a wireless network as described herein. Memory 614 can further retain an authorization ticket associated with wireless communications apparatus 602 and/or one or more devices 604.

Memory 614 can further retain instructions related to obtaining a first authorization ticket for a first device issued by a trusted third party, receiving from a second device a second authorization ticket for the second device, the second authorization ticket is issued by the trusted third party or another trusted party, and establishing a validated communication session with the second device. The processor 616 is configured to execute the instructions retained in the memory.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 614 of the disclosed aspects are intended to comprise, without being limited to, these and other suitable types of memory.

Figure 7:
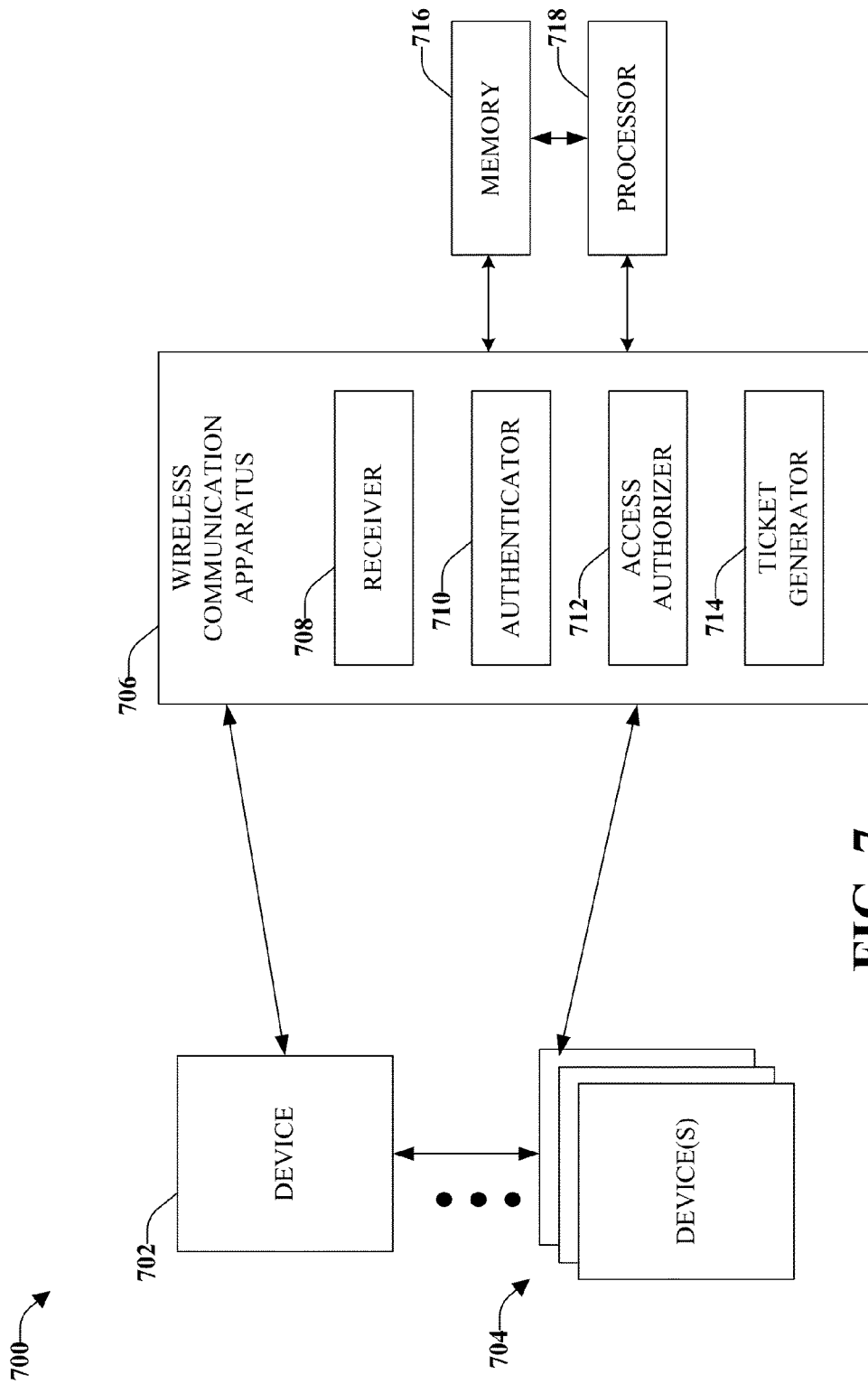
FIG. 7 illustrates a system for spectrum authorization and access control.

FIG. 7 illustrates a system for spectrum authorization and access control 700. System 700 is similar to system 600 of FIG. 6 and includes a device 702 that communicates with other devices 704 and with one or more trusted parties, illustrated as wireless communication apparatus 706.

A trusted party 706 can include a receiver 708 that is configured to receive a request from a first device, such as device 702, for system access. Receiver 708 can also receive requests from one or more of the other devices 704 at substantially the same time as receiving a request from first device 702, at a different time, or combinations thereof.

Based on the request, an authenticator 710 can be configured to obtain authentication of the first device 702 (or another device that transmitted the request). In accordance with some aspects, the first device authentication is obtained from an external source, such as from a network device over a secure communication link and/or from a home server. For example, the external source can be a server that has a business relationship with the first device (e.g., user in possession of the device) and the server can verify the subscription (e.g., the services for which the user has subscribed).

Based in part on the authentication of the first device 702, an access authorizer 712 can determine the system access that can be authorized for the first device 702 (or another device 704). According to some aspects, access authorizer 712 can consult a configuration parameters database that contains a listing of a plurality of devices that are authorized to access the system to determine the access to which the first device is entitled. The configuration parameters database can also contain one or more configuration parameters (e.g., a set of configuration parameters) associated with each device. If first device is included in the listing, the first device is authorized to access the system. However, if first device is not included in the listing, the first device is not authorized to access the system. The configuration parameters database can be dynamically updated, such as when there is a change to the database and/or based on other criteria.

In accordance with some aspects, authenticator 710 and/or or access authorizer 712 can review credentials associated with the first device 702 (or another device 704) to make respective determinations. The credentials can be at least one of shared secret keys, public keys, authorization information, a list of services, billing information, or combinations thereof.

Authorization ticket generator 714 can create an authorization ticket for the first device 702 (and/or the other devices 704) based on the authorized system access as determined by access authorizer 712. A part of the authorization ticket creation can include the generation of a cryptographic signature on which the validity of the authorization ticket relies. The authorization ticket can include an identity of the first device, a validity range during which the authorization ticket is valid, a cryptographic signature, and/or other parameters.

System 700 can include a memory 716 operative connected to (or included within) wireless communications apparatus 706. Memory 716 can store instructions related to receiving a request from at least a first device for system access, performing authentication of the at least a first device, determining system access that can be authorized for the first device, and generating an authorization ticket for the at least a first device based in part on the authorized system access. A processor 718 can be coupled to the memory 716 and can be configured to execute the instructions retained in the memory 716.

Figure 8:
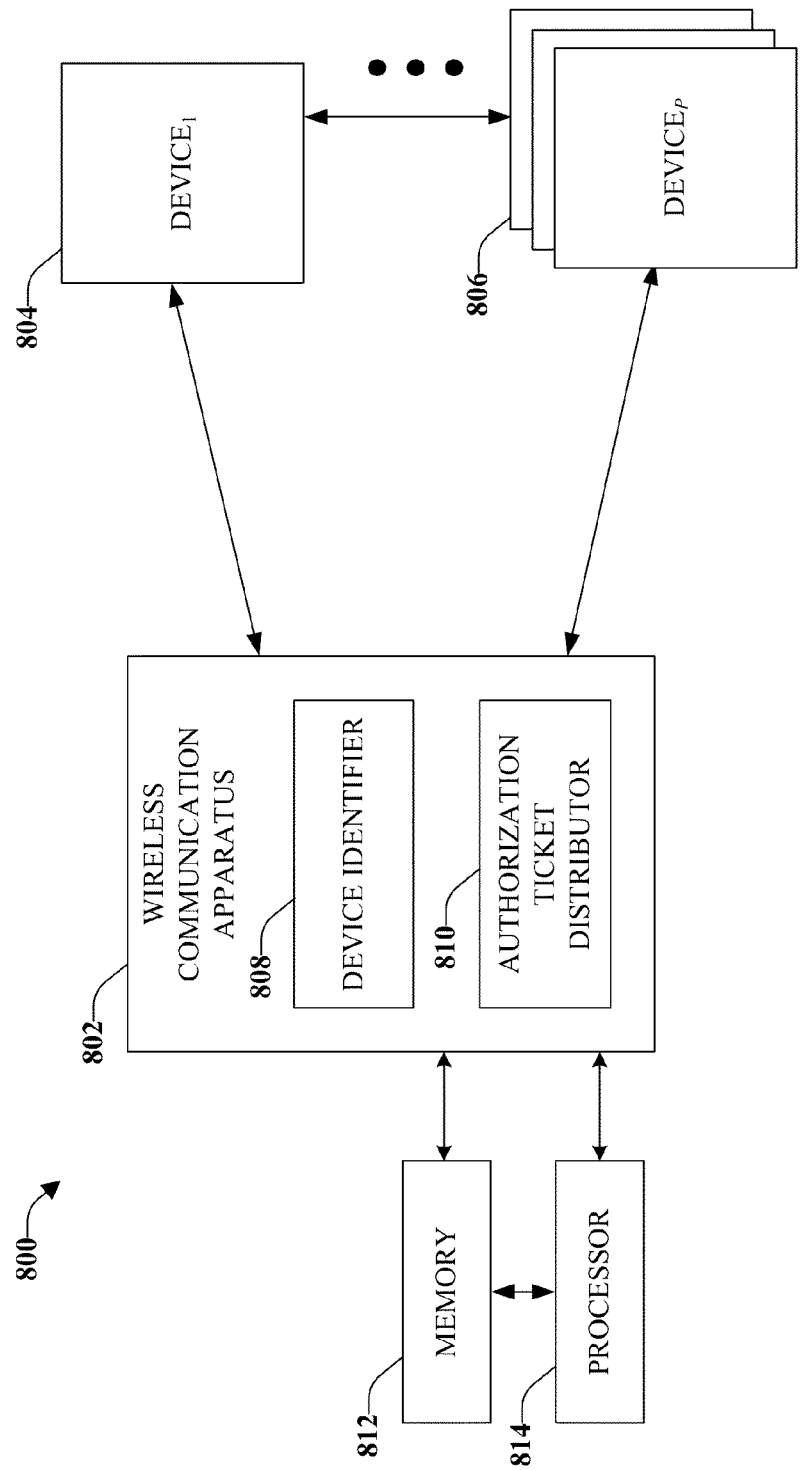
FIG. 8 illustrates a system for validation of ticket-based configuration parameters.

With reference now to FIG. 8, illustrated is a system 800 for validation of ticket-based configuration parameters. System 800 can be configured to enable authorized devices to communicate over a licensed spectrum through the utilization of authorization tickets. A device that desires to communicate with another device can verify link configuration parameters claimed by the other device have been authorized by a mutually trusted third party.

Included in system 800 is a wireless communications apparatus 802 that can be, for example a trusted third party, such as an authorization server. Wireless communications apparatus 802 is configured to communicate with one or more devices, labeled Device$_1$ 804 through Device$_P$ 806, where P is an integer.

Included in wireless communication apparatus 802 is device identifier 808 that can selectively recognize each device 804, 806 based, in part, on a request for system access. For example, each device 804, 806 can be identified by a unique identifier, such as a hardware address. Further, device identifier 808 can include other authentication and/or authorization information associated with each device 804, 806. For example, credentials such as shared secret keys, public keys, authorization information, a list of services each device is entitled to, associated billing/charging information, and so forth can be retained by (or accessible by) device identifier 808.

In accordance with some aspects, device identifier 808 includes a configuration parameters database that can contain a database of devices that are authorized for using the spectrum. The database can also contain configuration information and/or assigned parameters for each device. In accordance with some aspects, a subset of the parameters can be generated at the time a request for authorization is received from a device. Other parameters, such as IP addresses, can be assigned from a pool of available addresses and/or obtained from another server. In accordance with some aspects, configuration information can be stored as dictated by service agreements and the like.

If the device identifier 808 does not have (or cannot obtain) all the necessary information for one or more devices 804, 806, the information can be obtained from another server or network device that holds, or has access to, the needed information in its entirety or in part. Obtaining the information from another server or network device can be conducted in a secure manner. In this situation, wireless communications apparatus 802 can utilize a communication interface to communicate with another server that holds authentication/authorization information for all or some devices 804, 806. In accordance with some aspects, information associated with some or all devices 804, 806 can reside at multiple network nodes.

The purpose of consulting a database is to check the identity of the device seeking authorization and to determine the services the device is entitled to according to a user service agreement or the like. Consulting the database is a portion of the process that wireless communication apparatus 802 conducts for each device 804, 806 seeking system access.

An authorization ticket distributor 810 selectively distributes authorization tickets to devices 804, 806. The distribution of authorization tickets can be a result of validating a device's credentials and the services the device is entitled to have access to and to utilize. Further, the authorization tickets are exchanged between devices and verified as a condition to bringing up or enabling a wireless link using the spectrum to carry user or control data communication. In such a manner, only authorized devices are enabled to use the spectrum for data communication in accordance with the aspects presented herein. According to some aspects, the authorization ticket is implements as a traditional digital certificate, such as a X.509 certificate, that can include an IP address.

Further, a memory 812 can be operatively coupled to wireless communications apparatus 802. Memory 812 can be external to wireless communications apparatus 802 or can reside within wireless communications apparatus 802. Memory 812 can store information related to associating a device with one or more validated information elements and transmitting an authorization ticket, certified by a trusted party to the device. The ticket can include a subset of the one or more validated information elements.

Retaining the authentication ticket in memory can mitigate the need to obtain the authentication ticket when a validated communication session is to be established. Thus, if the authentication server and/or source of the authentication ticket is not available (e.g., limited connectivity), the authentication ticket retained in memory can be utilized. In accordance with some aspects, an updated authentication ticket is obtained when connectivity is restored.

Information elements can be expressions, addresses, a phone number, and/or other information that is to be presented to a user (e.g., visual information, audible information, and so forth). In accordance with some aspects, information elements can be configuration parameters and/or an IP address. Additionally or alternatively, information elements can be identifiers that are being broadcast and or advertised. Further, information elements can be a name, an identity, a location, user information (e.g., an emotion the user wants to express), a trademark, and any other data.

In accordance with some aspects, only a subset of available information elements is included in an authentication ticket. For example, if there are hundreds or thousands of information elements that can be included in an authentication ticket, only a subset of those information elements might be included in the authentication ticket. The determination of which information elements to include can be a function of the source of the information elements (and authentication ticket) and/or the destination of the information elements (and authentication ticket).

The information elements can be validated in order to provide some reliability to the information elements. Validated information elements can mitigate the need to independently validate the information elements (e.g., no need to access another device, another database, or any other source) since the information elements are pre-validated by the server.

A processor 814 can be operatively connected to wireless communications apparatus 802 (and/or memory 812) to facilitate analysis of information related to spectrum authorization and access control in an ad-hoc communication network. Processor 814 can be a processor dedicated to analyzing and/or generating information received by wireless communications apparatus 802, a processor that controls one or more components of system 800, and/or a processor that both analyzes and generates information received by wireless communications apparatus 802 and controls one or more components of system 800.

Memory 812 can store protocols associated with spectrum authorization, access control between wireless communications apparatus 802, device(s) 804, 806 and/or other trusted parties, such that system 800 can employ stored protocols and/or algorithms to achieve improved communications in a wireless network as described herein. In accordance with some aspects, memory retains instructions related to associating a device with one or more validated information elements and transmitting an authorization ticket, certified by wireless communications apparatus, to the device.

Figure 9:
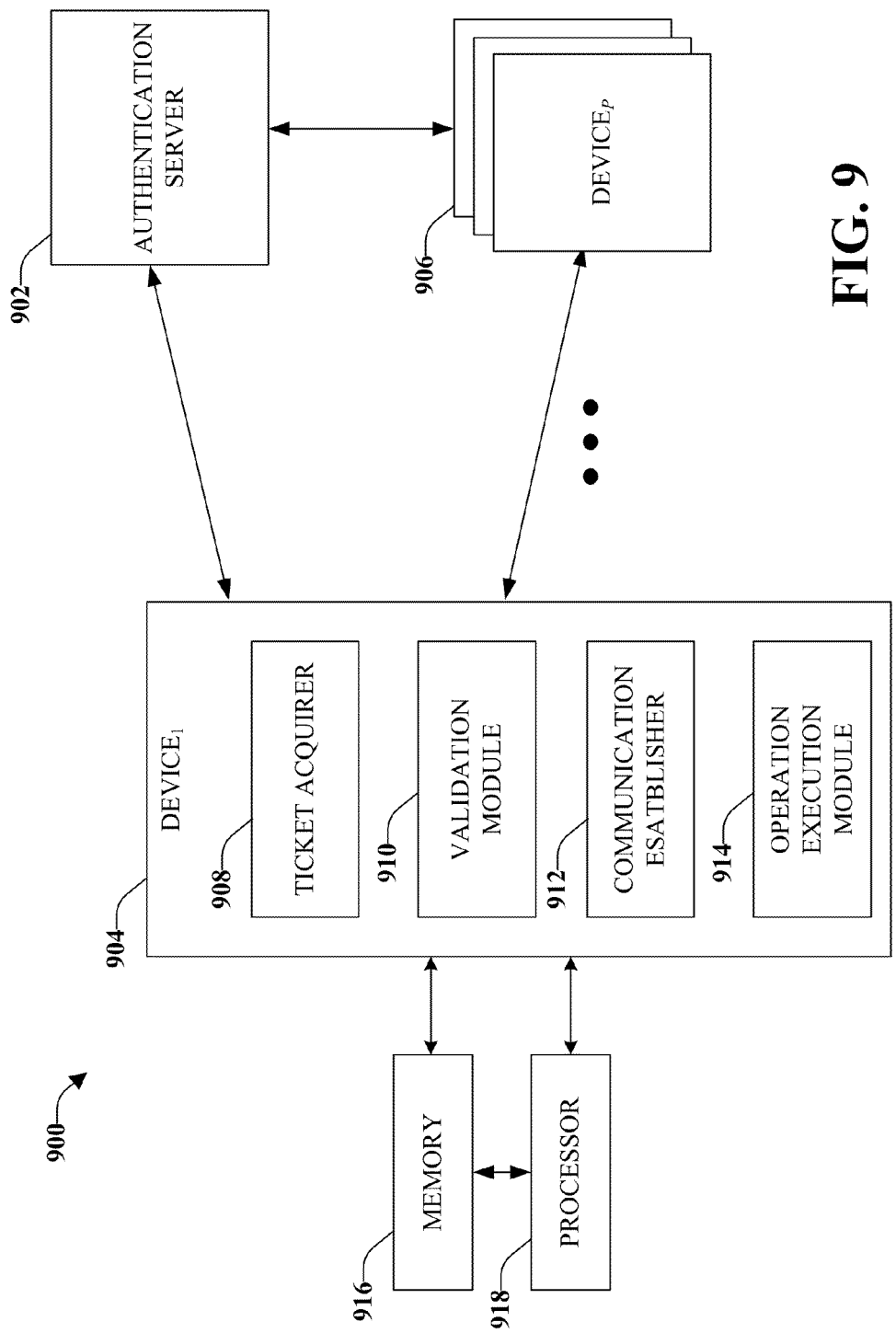
FIG. 9 illustrates another system for validation of ticket-based configuration parameters.

FIG. 9 illustrates another system 900 for validation of ticket-based configuration parameters. System 900 is similar to the system of the above figure and includes an authentication server 902, a first device 904, and one or more other devices 906.

Device 904 can include a ticket acquirer 908 that obtains an authorization ticket. The authorization ticket can include one or more validated information elements associated with another device (e.g., a device with which a validated communication session is to be established), this device will be referred to herein as second device 904. At least one of the validated information elements is an Internet Protocol address. In accordance with some aspects, the authorization ticket includes an identifier of the second device 904, a validity range, and a signature of a trusted party that issued the authorization ticket to the second device 904. Also included in device 904 is a validation module 910 that validates the authorization ticket.

A communication establisher 912 utilizes the authorization ticket to establish a validated communication with the second device 904. The validated communication can be broadcast or multicast. In accordance with some aspects, the validated communication is with the second device 904 in a peer-to-peer or ad-hoc configuration. Additionally, the communication with the second device 904 can be over a secure communication link.

Device 904 also includes an operation execution module 914 that uses a subset of the one or more validated information elements to perform a configuration operation. The configuration operation can include configuring an interface and/or adding a route.

A memory 916 is operatively connected to device 904 and is configured to retain instructions related to obtaining an authorization ticket that includes one or more validated information elements associated with a second device. The memory also retains instructions related to validating the authorization ticket, utilizing the authorization ticket to establish a validated (and possibly secure) communication with the second device, and using a subset of the one or more validated information elements to perform a configuration operation. A processor 918 is coupled to the memory 916 and is configured to execute the instructions retained in the memory 916.

In view of the exemplary systems shown and described, methodologies that may be implemented in accordance with the disclosed subject matter, will be better appreciated with reference to the flow charts provided herein. While, for purposes of simplicity of explanation, the methodologies may be shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 10:
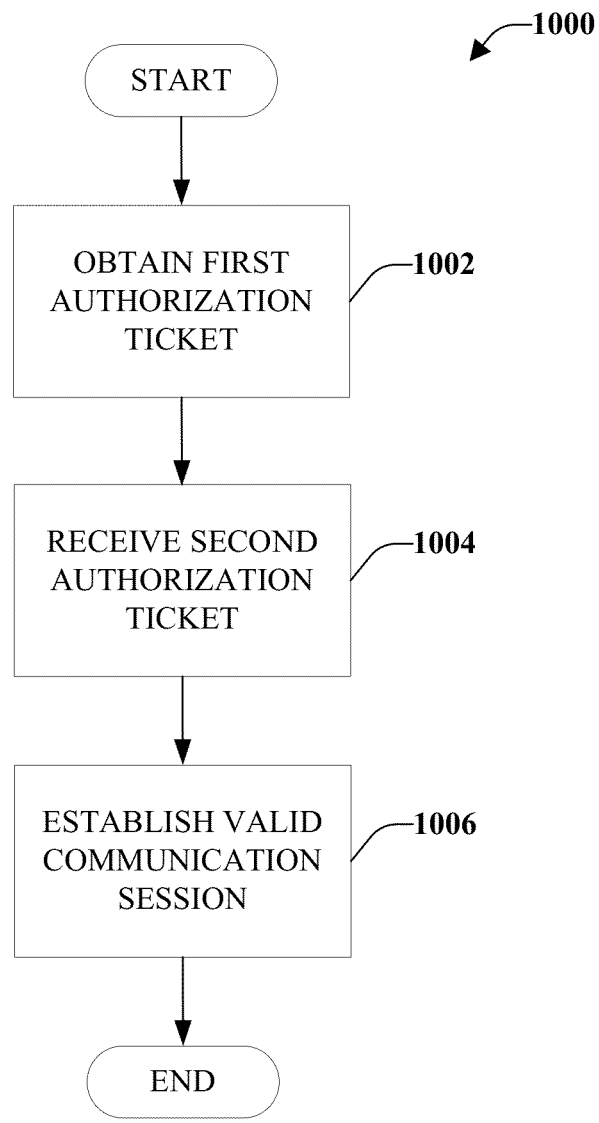
FIG. 10 illustrates a method for spectrum authorization and access control.

FIG. 10 illustrates a method 1000 for spectrum authorization and access control. Method 1000 can enable utilization of a spectrum by authorized devices operating in an ad-hoc or peer-to-peer fashion, without the need for a controlled infrastructure.

Method 1000 starts, at 1002, when a first authorization ticket is obtained from a trusted third party. The trusted third party can be, for example, an authorization server. The authorization ticket can include an identifier of a device and a signature of the trusted third party. In accordance with some aspects, the first authorization ticket is transmitted to a second device.

A second authorization ticket is received from an associated device, at 1004. The second authorization ticket can be issued by the trusted third party that issued the first authorization ticket or the second authorization ticket can be issued by another trusted party. The second authorization ticket can include a validity time or a cryptographic signature of the trusted party that issued the second authorization ticket (e.g., the trusted third party or the another trusted party). In accordance with some aspects, the first authorization ticket comprises services allowed to be accessed by the first device and the second authorization ticket comprises services allowed to be accessed by the second device.

A valid communication session with the associated device is established, at 1006. The validated communication session can be configured to carry data of a type and manner specified in a list of allowed services included in the first authorization ticket and the second authorization ticket.

In accordance with some aspects, establishing the valid communication session can include validating the second authorization ticket. A failure to validate the second authorization ticket for the second device can result in tearing down a communication link between the first device and the second device. Validating the second authorization ticket can include verifying a validity time and a cryptographic signature. In accordance with some aspects, validating the second authorization ticket includes validating an identity of the second device as identified in the second authorization ticket. Additionally or alternatively, validation the second authorization ticket includes verifying possession of a private key associated with an identity and a public key included in a digital certificate and/or verifying a shared key derived though a mutual authentication process that occurred some time in the past between the devices.

Method 1000 can also include securing the validated communication session based on information contained in the first authorization ticket and the second authorization ticket. Securing the validated communication session includes encryption/decryption and integrity protection.

In accordance with some aspects, the first authorization ticket and/or the second authorization ticket are embodied as a traditional digital certificate. For example, the traditional digital certificate can be a X.509 standard with new extensions to indicate authorization for spectrum use and can convey information pertaining to setting up validated communication links. In another example, the traditional digital certificate can be a X.509 certificate that includes a new extension that contains an IP address.

Figure 11:
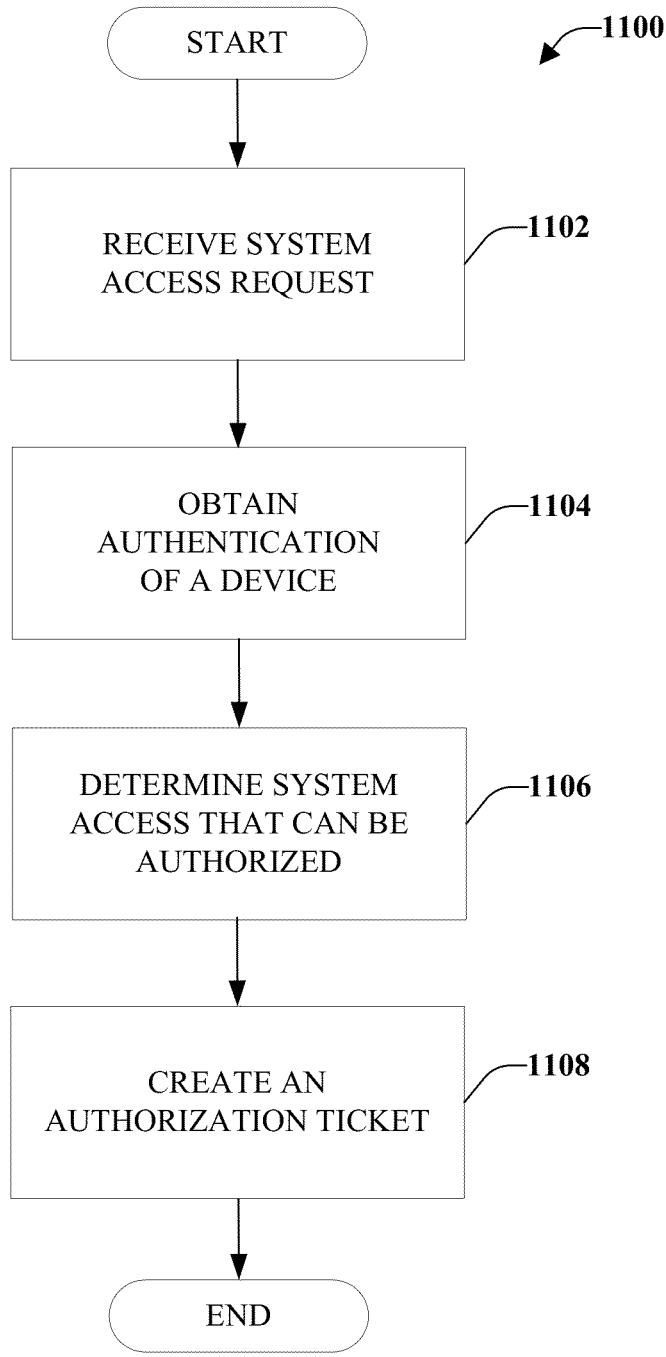
FIG. 11 illustrates a method for spectrum authorization and access control.

With reference now to FIG. 11, illustrated is a method 1100 for spectrum authorization and access control. At 1102, a request for system access (e.g., access to a licensed spectrum) is received from at least a first device. In accordance with some aspects, multiple requests from a number of devices are received at substantially the same time, at different times, or combinations thereof.

At 1104, authentication of the first device is obtained from an internal source, from and external source, or combinations thereof. If obtained externally, the authentication can be obtained from a network node over a secure communication link. In accordance with some aspects, the authentication is obtained externally from another server.

System access that can be authorized for the first device is determined, at 1106. In accordance with some aspects, determining system access includes consulting a configuration parameters database that contains a listing of a plurality of devices that are authorized to access the system.

The authentication of the first device, at 1104, and/or the authorized system access, at 1106, can be determined by credentials associated with the first device. The credentials can be one or more of shared secret keys, public keys, authorization information, and a list of services or billing information, or combinations thereof.

At 1108, an authorization ticket for at least the first device is created based on the authorized system access to which the first device is entitled. The authorization ticket can include an identity of the first device, a validity range during which the authorization ticket is valid, and/or a cryptographic signature of the party that issued the authorization ticket.

Figure 12:
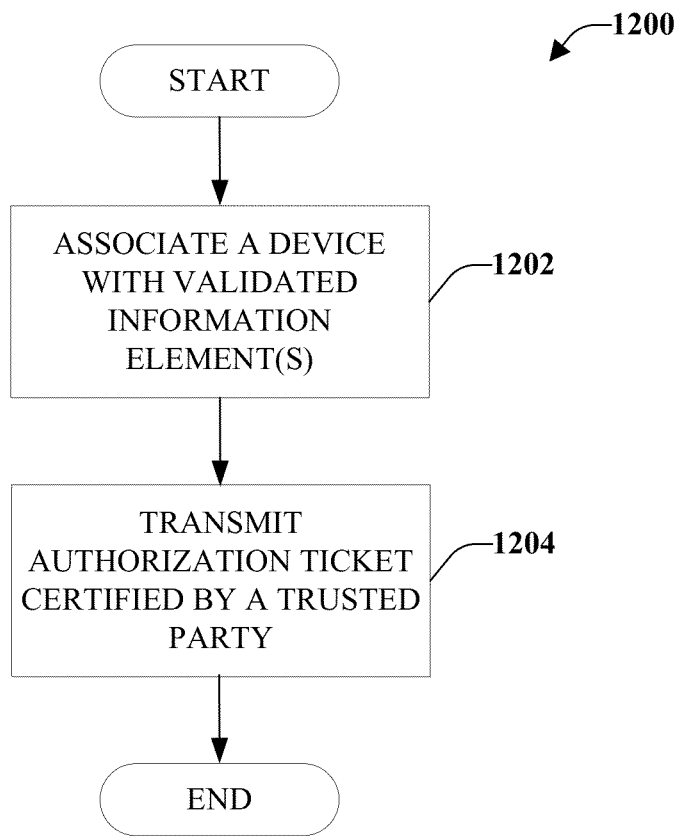
FIG. 12 illustrates a method for validating ticket-based configuration parameters.

FIG. 12 illustrates a method 1200 for validating ticket-based configuration parameters. Method 1200 starts, at 1202, when a device is associated with one or more validated information elements. The information elements can include an Internet Protocol address assigned to the device, a telephone number assigned to the device, and/or other information.

In accordance with some aspects, prior to associating the device with the one or more information elements, an authorization protocol is employed to communicate with the device. Based in part on the communication with the device, a determination is made whether to construct an authorization ticket for the device and the information elements that should be included in the authorization ticket.

According to some aspects, a database of authorized devices and associated parameters identified by a unique device identifier is consulted to determine whether to associate the device with the information element(s). The database can contain information relating to a configuration each device can use when communicating using a licensed spectrum.

At 1204, an authorization ticket is transmitted to the device. The authorization ticket is certified by a trusted party and includes a subset of the one or more validated information elements. The device uses the authorization ticket to establish a communication link with another device. In accordance with some aspects, the authorization ticket includes an identifier of the device, a validity range, and a signature of the trusted party.

In accordance with some aspects, the authorization ticket is implemented as a traditional digital certificate. For example, the traditional digital certificate can be a X.509 standard with new extensions to indicate authorization for spectrum use and can convey information pertaining to setting up validated communication links. In another example, the traditional digital certificate can be a X.509 certificate that includes a new extension that contains an IP address.

Figure 13:
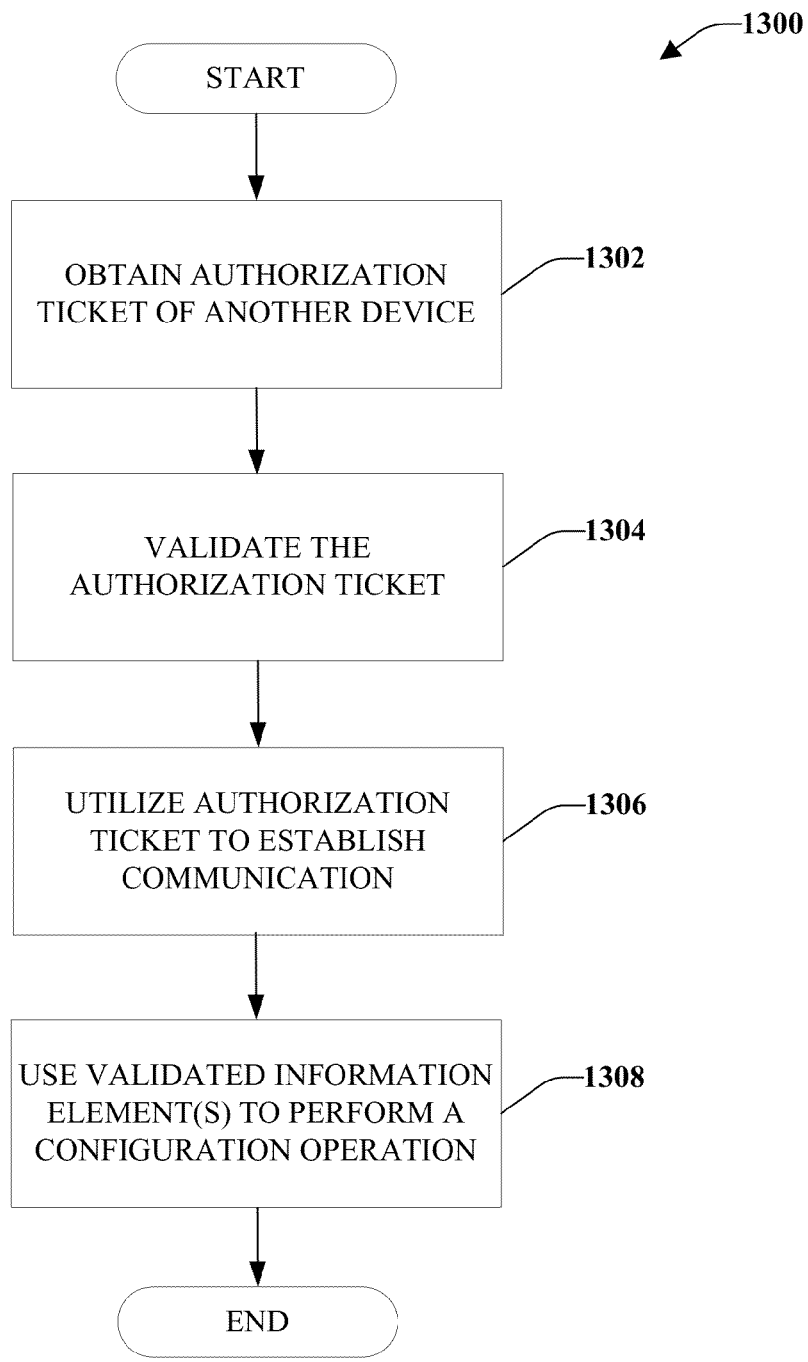
FIG. 13 illustrates a method for validation of ticket-based configuration parameters.

FIG. 13 illustrates a method 1300 for validation of ticket-based configuration parameters. At 1302, an authorization ticket for a device (with which a validation communication session is to be established) is obtained. The authorization ticket can include one more validated information elements associated with the device. In accordance with some aspects, the authorization ticket includes an identifier of the device, a validity range, and a signature of a trusted party that issued the authorization ticket. At least one of the validated information elements is an Internet Protocol address. The authorization ticket is validated, at 1304.

The authorization ticket is utilized, at 1306, to establish a validated (and possibly secure) communication with the device. The communication can be broadcast or multicast. In accordance with some aspects, the validated communication with the device is a peer-to-peer configuration.

At 1308, a subset of the one or more validated information elements is used to perform a configuration operation. In accordance with some aspects, the configuration operation comprises configuring an interface. According to some aspect, the configuration operation comprises adding a route.

Figure 14:
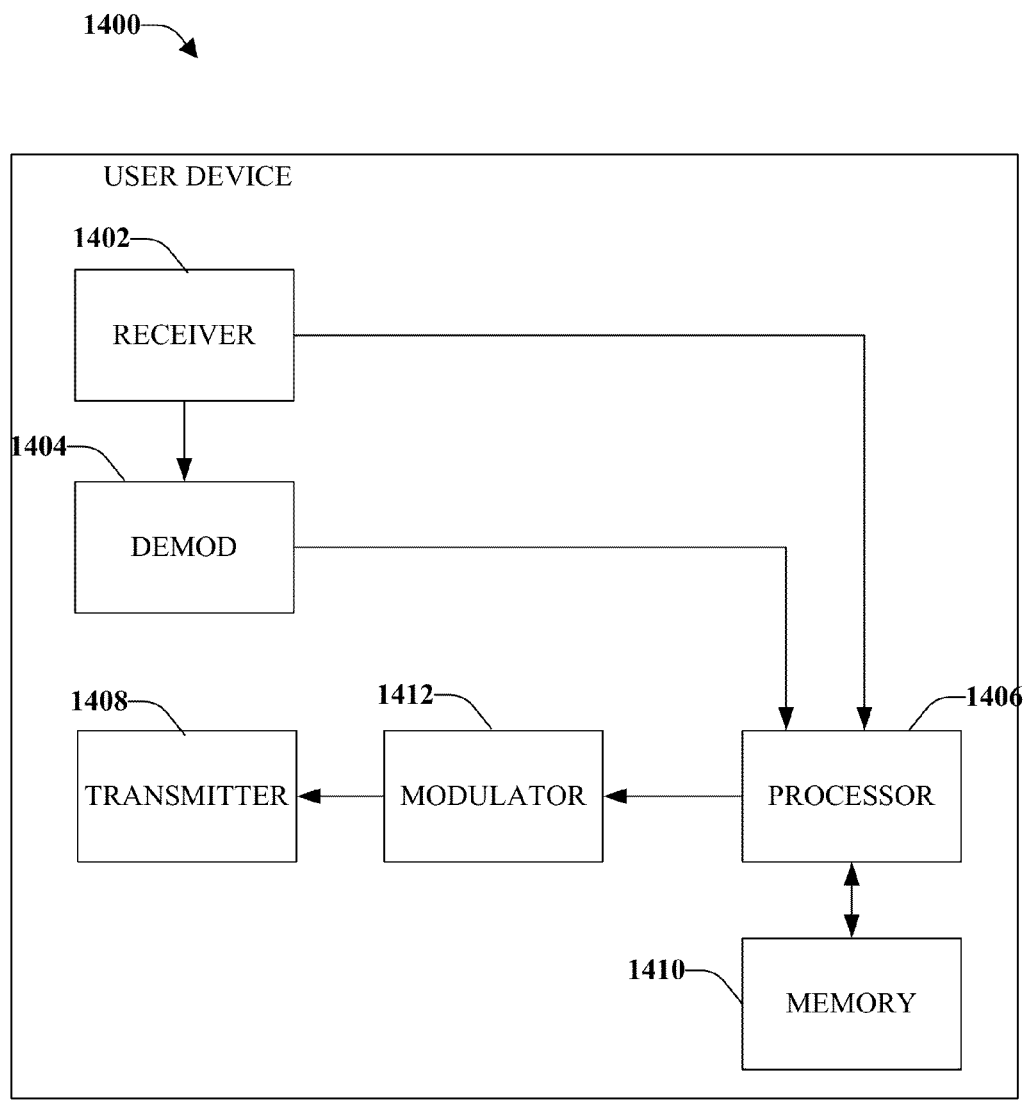
FIG. 14 illustrates a system that facilitates ticket based authorization and validation in accordance with the disclosed aspects.

With reference now to FIG. 14, illustrated is a system 1400 that facilitates ticket based authorization and validation in accordance with the disclosed aspects. System 1400 can reside in a user device. System 1400 comprises a receiver 1402 that can receive a signal from, for example, a receiver antenna. The receiver 1402 can perform typical actions thereon, such as filtering, amplifying, downconverting, etc. the received signal. The receiver 1402 can also digitize the conditioned signal to obtain samples. A demodulator 1404 can obtain received symbols for each symbol period, as well as provide received symbols to a processor 1406.

Processor 1406 can be a processor dedicated to analyzing information received by receiver component 1402 and/or generating information for transmission by a transmitter 1408. In addition or alternatively, processor 1406 can control one or more components of user device 1400, analyze information received by receiver 1402, generate information for transmission by transmitter 1408, and/or control one or more components of user device 1400. Processor 1406 may include a controller component capable of coordinating communications with additional user devices. User device 1400 can additionally comprise memory 1408 operatively coupled to processor 1406 and that can store information related to coordinating communications and any other suitable information.

Figure 15:
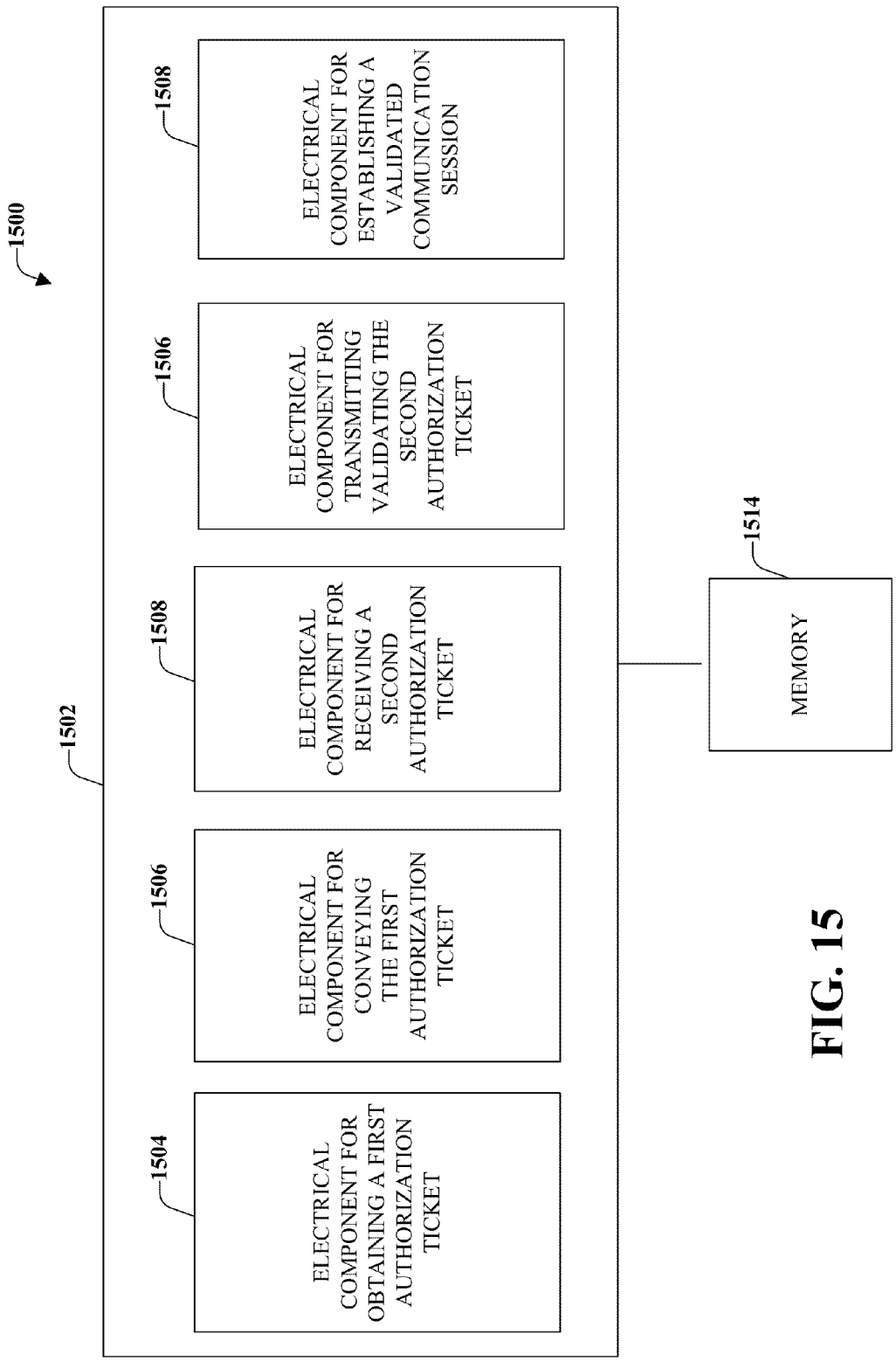
FIG. 15 illustrates an example system that facilitates spectrum authorization and access control in an ad hoc (peer-to-peer) environment.

FIG. 15 illustrates an example system 1500 that facilitates spectrum authorization and access control in an ad hoc (peer-to-peer) environment. System 1500 includes a logical grouping 1502 of electrical components that can act separately or in conjunction. Logical grouping 1502 includes an electrical component 1504 for obtaining a first authorization ticket for a first device. The first authorization ticket can be issued by a trusted third party. In accordance with some aspects, the trusted third party is an authorization server.

Also included in logical grouping 1502 is an electrical component 1506 for conveying the first authorization ticket to a second device. The first authorization ticket includes an identifier of the first device and a signature of the trusted third party. An electrical component 1508 for receiving from the second device a second authorization ticket for the second device is also included.

Logical grouping 1502 also includes an electrical component 1510 for validating the second authorization ticket for the second device. The second authorization ticket can include a validity time or a cryptographic signature of the issuer of the second authorization ticket (e.g., trusted third party or another trusted party). Validating the second authorization ticket includes verifying both the validity time and the cryptographic signature. In accordance with some aspects, validating the second authorization ticket includes validating an identity of the second device as identified in the second authorization ticket, verifying possession of a private key associated with an identity and a public key included in a digital certification, or verifying a shared key derived through a mutual authentication process, or combinations thereof.

In accordance with some aspects, if there is a failure while validating the second authorization ticket for the second device, a communication link that was established between the first device and the second device is torn down. The communication link that is torn down is a non-validated link that the devices utilized to exchange authorization tickets and/or other information in order for a validated communication to be established.

An electrical component 1512 for establishing a validated communication session with the second device is also included in logical grouping 1502. The validated communication session can be configured to carry data of a type and manner specified in a list of allowed services included in the first authorization ticket, the second authorization ticket, or both tickets. In accordance with some aspects, the first authorization ticket includes services allowed to be accessed by the first device and the second authorization ticket comprises services allowed to be accessed by the second device.

Additionally, system 1500 can include a memory 1514 that retains instructions for executing functions associated with electrical components 1504, 1506, 1508, 1510, and 1512 or other components. While shown as being external to memory 1514, it is to be understood that one or more of electrical components 1504, 1506, 1508, 1510, and 1512 may exist within memory 1514.

Figure 16:
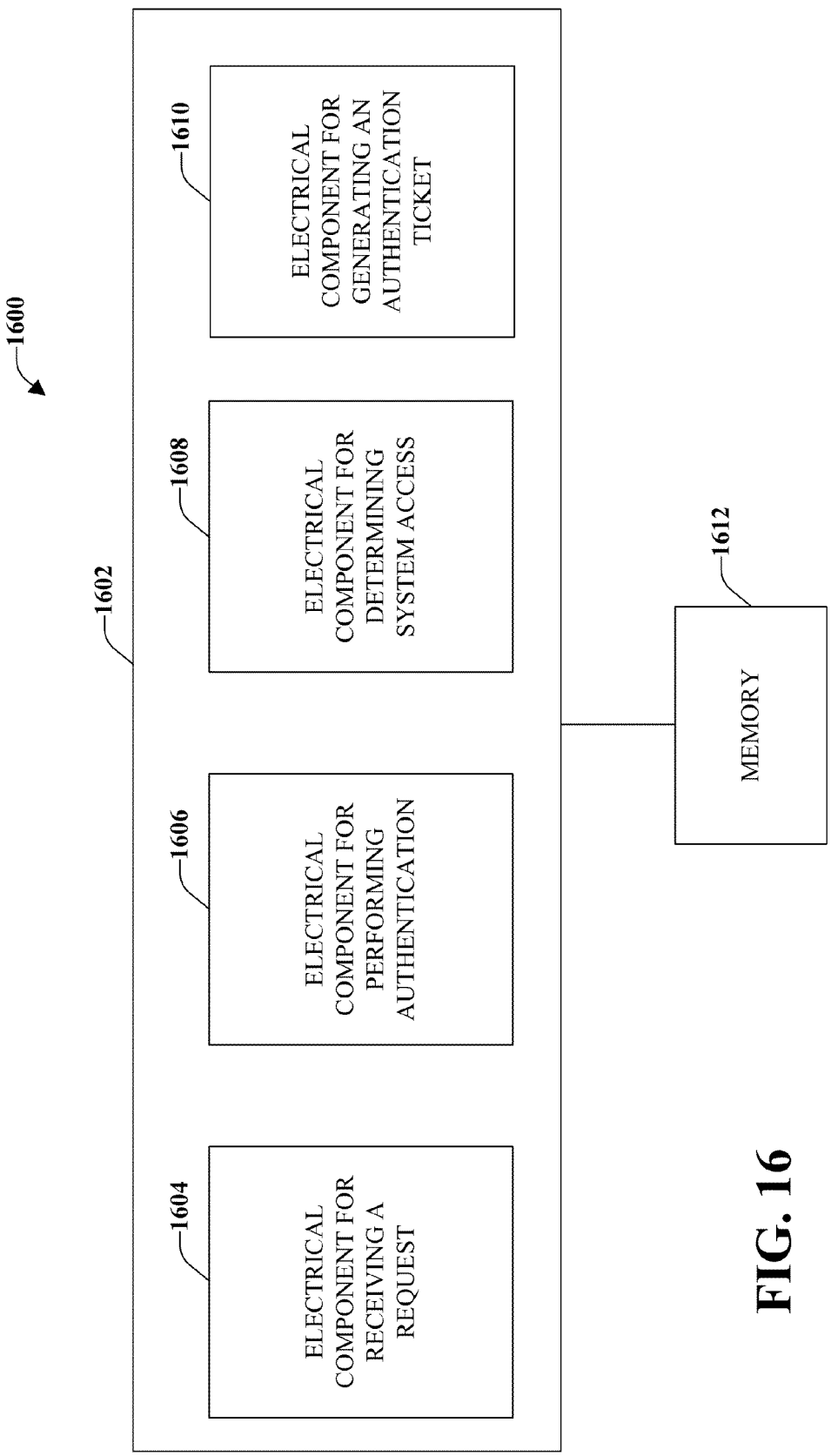
FIG. 16 illustrates an example system that provides spectrum authorization.

FIG. 16 illustrates an example system 1600 that provides spectrum authorization. Included in system is a logical grouping 1602 of electrical components that can act separately or in conjunction. Logical grouping 1602 includes an electrical component 1604 for receiving a request from at least a first device for access to a spectrum.

Also included in logical grouping 1602 is an electrical component 1606 for performing authentication of the at least a first device. The authentication can be performed using an internal source or an external source. In accordance with some aspects, the first device authentication is performed with the assistance of an external network device over a secure communication link.

An electrical component 1608 for determining system access that can be provided to the at least a first device is also included. In accordance with some aspects, electrical component 1608 determines system access by consulting a configuration parameters database that contains a listing of a plurality of devices that are authorized to access the system.

According to various aspects, electrical component 1606 can perform authentication and/or electrical component 1608 can determine spectrum access by reviewing credentials associated with the first device. The credentials can include one ore more shared secret keys, public keys, authorization information, a list of services, billing information, or combinations thereof.

Logical grouping 1602 further includes an electrical component 1610 for generating an authorization ticket for the at least a first device based in part on the spectrum access that can be provided to the at least a first device. The authorization ticket can include an identity of the first device, a validity range during which the authorization ticket is valid, and/or a cryptographic signature.

In accordance with some aspects, logical grouping 1602 includes an electrical component (not shown) for transmitting the authorization ticket to the first device. In accordance with some aspects, multiple authorization tickets can be generated based on receipt of a multitude of requests. Each authorization ticket can be unique for each device and transmitted to each device individually.

System 1600 can also include a memory 1612 that retains instructions for executing functions associated with electrical components 1604, 1606, 1608, and 1610, or other components. While shown as being external to memory 1612, one or more of electrical components 1604, 1606, 1608, and 1610 can exist within memory 1612.

Figure 17:
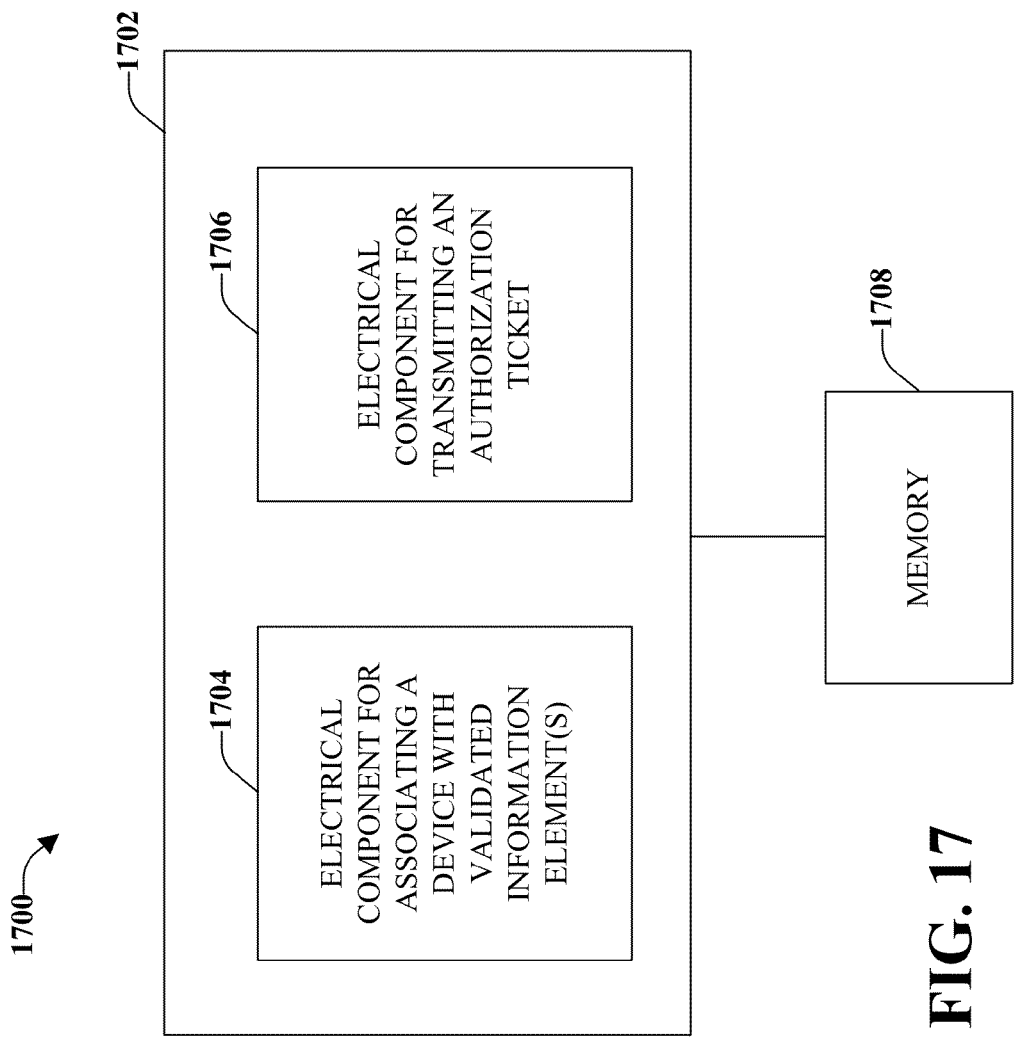
FIG. 17 illustrates an example system that validates ticket-based configuration parameters in a communication environment.

FIG. 17 illustrates an example system 1700 that validates ticket-based configuration parameters in a communication environment. The communication environment can be in a peer-to-peer configuration or an ad-hoc configuration. Included in system 1700 is a logical grouping 1702 of electrical components that can act separately or in conjunction. Included in logical grouping 1702 is an electrical component 1704 for associating a device with one or more validated information elements. In accordance with some aspects, the information elements can be an Internet Protocol address assigned to the device and/or a telephone number assigned to the device.

Logical grouping 1702 also includes an electrical component 1706 for transmitting an authorization ticket certified by a trusted party to the device. The authorization ticket can include a cryptographic signature of the trusted party as well as other information (e.g., device identifier, services to which a device can gain access, and so forth).

It should be noted that the process of validating the information elements is separate and distinct from the validation of authorization tickets. The trusted third party can obtain pre-validated information elements from another party or can validate the information elements itself through some other, separate process.

In accordance with some aspects, logical grouping 1702 includes an electrical component (not shown) for employing an authentication protocol or authorization protocol to communication with the device. Also included can be an electrical component (not shown) for determining whether to construct an authorization ticket and which information elements to include in the authorization ticket. The determination can be made based in part on the communication with the device.

According to some aspects, logical grouping 1702 includes an electrical component (not shown) for consulting a database of authorized devices and associated parameters identified by a unique device identifier. The database can contain information related to a configuration each device can utilize when communicating using the licensed spectrum.

A memory 1708 that retains instructions for executing functions associated with electrical components 1704 and 1706 or other components is also included in system. Although an external memory 1708 is illustrated, in accordance with some aspects, one or more of electrical components 1704 and 1706 may exist within memory 1708.

Figure 18:
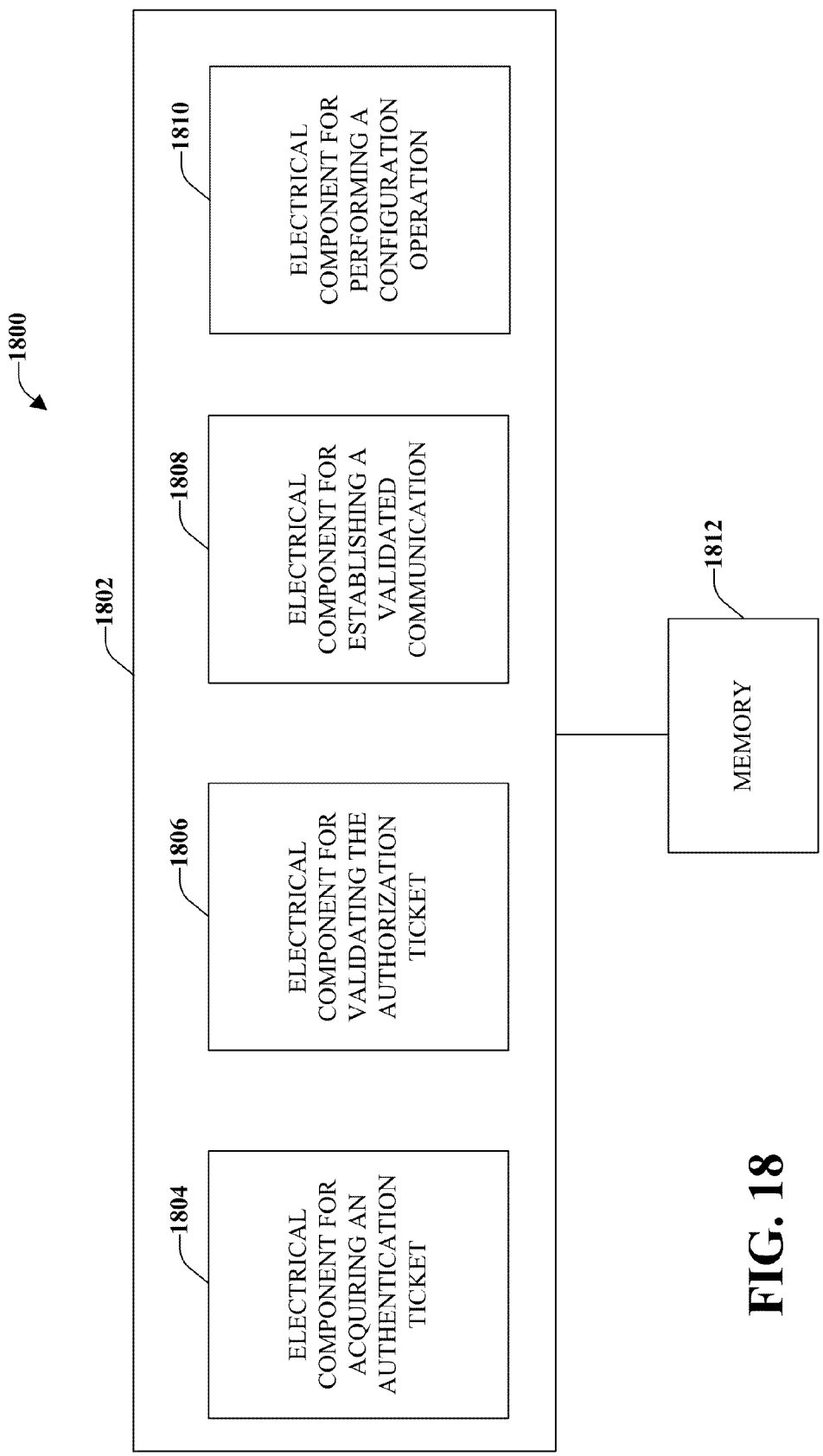
FIG. 18 illustrates an example system that validates ticket-based configuration parameters.

With reference to FIG. 18, illustrated is an example system 1800 that validates ticket-based configuration parameters. System 1800 includes a logical grouping 1802 that includes an electrical component 1804 for acquiring an authorization ticket that includes one or more validated information elements associated with another device. In accordance with some aspects, at least one of the validated information elements is an Internet Protocol address.

Also included in logical grouping 1802 is an electrical component 1806 for validating the authorization ticket. The authorization ticket can include an identifier of the another device, a validity range, and a signature of a trusted party that issued the authorization ticket.

Logical grouping 1802 also includes an electrical component 1808 for establishing a validated communication with the another device based in part on the authorization ticket. The validated communication can be broadcast or multicast. The validated communication with the another device is a peer-to-peer configuration and/or an ad-hoc configuration.

An electrical component 1810 for performing a configuration operation with a subset of the one or more validated information elements is also included. The configuration operation can include configuring an interface and/or adding a route.

Additionally, system 1800 can include a memory 1812 that retains instructions for executing functions associated with electrical components 1804, 1806, 1808, and 1810 or other components. While shown as being external to memory 1812, it is to be understood that one or more of electrical components 1804, 1806, 1808, and 1810 can exist within memory 1812.

It is to be appreciated that the system 1500, 1600, 1700, and 1800 of FIGS. 15, 16, 17, and 18, described above, are represented as including functional blocks, which may be functional blocks that represent functions implemented by a processor, software, or combination thereof (e.g., firmware).

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user device. In the alternative, the processor and the storage medium may reside as discrete components in a user device. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for validating ticket-based configuration parameters, comprising:
    employing an authentication protocol or authorization protocol to communicate with a device;
    determining whether to construct an authorization ticket for the device and information elements to include in the authorization ticket;
    constructing the authorization ticket to include a subset of one or more validated information elements associated with the device, the subset of the one or more validated information elements including a type of services allowed for a peer-to-peer communication link between the device and another device, wherein the authorization ticket includes the type of services allowed to said another device for the peer-to-peer communication link between the device and said another device, and at least one of a broadcastable expression, or an Internet Protocol address assigned to the device; and
    transmitting the authorization ticket certified by a trusted party to the device.

2. The method of claim 1, wherein the validated information elements includes the Internet Protocol address assigned to the device.

3. The method of claim 1, wherein the validated information elements includes a telephone number assigned to the device.

4. The method of claim 1, wherein the authorization ticket includes a cryptographic signature of the trusted party.

5. The method of claim 1, wherein the broadcastable expression is at least one of a name, an identity, a location, user information, or a trademark.

6. The method of claim 1, further comprises consulting a database of authorized devices and associated parameters identified by a unique device identifier, wherein the database contains information related to a configuration each device can use to communicate in a licensed spectrum.

7. The method of claim 1, wherein the authorization ticket includes an identifier of the device, a validity range, and a signature of the trusted party.

8. The method of claim 1, wherein the authorization ticket is implemented as a digital certificate.

9. The method of claim 1, further comprising verifying with the device the type of services allowed for the peer-to-peer communication link between the device and said another device.

10. A wireless communications apparatus, comprising:
a memory that retains instructions related to employing an authorization protocol to communicate with a device; determining whether to construct an authorization ticket for the device and information elements to include in the authorization ticket; constructing the authorization ticket to include a subset of one or more validated information elements associated with the device, the subset of the one or more validated information elements including a type of services allowed for a peer-to-peer communication link between the device and another device, wherein the authorization ticket includes the type of services allowed to said another device for the peer-to-peer communication link between the device and said another device, and at least one of a broadcastable expression, or an Internet Protocol address assigned to the device; and transmitting the authorization ticket certified by a trusted party to the device; and
a processor, coupled to the memory, configured to execute the instructions retained in the memory.

11. The wireless communications apparatus of claim 10, wherein the validated information elements include the Internet Protocol address assigned to the device, a telephone number assigned to the device, or both the Internet Protocol address and the telephone number.

12. The wireless communications apparatus of claim 10, the memory further retains instructions related to consulting a database of authorized devices and associated parameters identified by a unique device identifier, wherein the database contains information related to a configuration each device can use to communicate in a licensed spectrum.

13. The wireless communications apparatus of claim 10, wherein the authorization ticket includes an identifier of the device, a validity range, and a signature of the trusted party.

14. A wireless communications apparatus that provides ticket-based validation parameters, comprising:
means for employing an authentication protocol to communicate with a device;
means for determining whether to construct an authorization ticket for the device and information elements to include in the authorization ticket;
means for constructing the authorization ticket to include a subset of one or more validated information elements associated with the device, the subset of the one or more validated information elements including a type of services allowed for a peer-to-peer communication link between the device and another device, wherein the authorization ticket includes the type of services allowed to said another device for the peer-to-peer communication link between the device and said another device, and at least one of a broadcastable expression, or an Internet Protocol address assigned to the device; and
means for transmitting the authorization ticket certified by a trusted party to the device.

15. The wireless communications apparatus of claim 14, further comprising:
means for consulting a database of authorized devices and associated parameters identified by a device identifier, wherein the database contains information related to a configuration each device can use to communicate in a licensed spectrum.

16. The wireless communications apparatus of claim 14, wherein the authorization ticket includes an identifier of the device, a validity range, and a signature of the trusted party.

17. The wireless communications apparatus of claim 14, wherein the broadcastable expression is at least one of a name, an identity, a location, user information, or a trademark.

18. A computer program product, comprising:
a non-transitory computer-readable medium comprising:
a first set of codes for causing a computer to communicate with a device;
a second set of codes for causing the computer to determine whether to create an authorization ticket for the device and information elements to include in the authorization ticket;
a third set of codes for causing the computer to construct the authorization ticket to include a subset of one or more validated information elements associated with the device, the subset of the one or more validated information elements including a type of services allowed for a peer-to-peer communication link between the device and another device, wherein the authorization ticket includes the type of services allowed to said another device for the peer-to-peer communication link between the device and said another device, and at least one of a broadcastable expression, or an Internet Protocol address assigned to the device; and
a fourth set of codes for causing the computer to communicate the authorization ticket to the device.

19. The computer program product of claim 18, wherein the authorization ticket includes an identifier of the device, a validity range, and a signature of a trusted party.

20. At least one processor configured to validate ticket-based configuration parameters, comprising:
a first module for consulting a database of authorized devices and associated parameters identified by a device identifier, wherein the database contains information related to a configuration each device can use to communicate in a licensed spectrum;
a second module for determining whether to construct an authorization ticket for a device and information elements to include in the authorization ticket;
a third module for constructing the authorization ticket to include a subset of one or more validated information elements associated with the device, the subset of the one or more validated information elements including a type of services allowed for a peer-to-peer communication link between the device and another device, wherein the authorization ticket includes the type of services allowed to said another device for the peer-to-peer communication link between the device and said another device, and at least one of a broadcastable expression, or an Internet Protocol address assigned to the device; and
a fourth module for transmitting the authorization ticket certified by a trusted party to the device, the ticket including the information related to the configuration the device can use to communicate.

* * * * *